United States Patent [19]

Matty

[11] 4,282,466
[45] Aug. 4, 1981

[54] TRANSIT VEHICLE MOTOR EFFORT CONTROL APPARATUS AND METHOD

[75] Inventor: Thomas C. Matty, North Huntingdon Township, Irwin County, Pa.

[73] Assignee: Westinghouse Electric Corp., Pittsburgh, Pa.

[21] Appl. No.: 902,001

[22] Filed: Apr. 27, 1978

Related U.S. Application Data

[63] Continuation of Ser. No. 709,821, Jul. 29, 1976, abandoned.

[51] Int. Cl.$^3$ .............................................. H02P 7/00
[52] U.S. Cl. .................................... 318/434; 318/332
[58] Field of Search ...................... 318/432, 434, 332; 307/31, 33, 35, 60, 62

[56] References Cited

U.S. PATENT DOCUMENTS

| | | | |
|---|---|---|---|
| 3,034,032 | 5/1962 | McWilliams | 318/434 |
| 3,526,819 | 9/1970 | Graf | 318/434 |
| 3,887,855 | 6/1975 | Klimo | 318/434 |

Primary Examiner—Gene Z. Rubinson
Assistant Examiner—Eugene S. Indyk
Attorney, Agent, or Firm—R. G. Brodahl

[57] ABSTRACT

There is disclosed a propulsion and brake effort control apparatus and method operative with the motors of a transit vehicle, including programmed microprocessor control apparatus for comparing the motor current desired by the vehicle control P signal with feedback information from the motor operation to determine the requested motor current by the phase angle relationship of ON and OFF pulses supplied to the current controlling chopper apparatus. The requested current and motor effort can be controlled by the operation of an effort control parameter provided in relation to high and low determined limits of the power supply line voltage, a high determined limit of the line current in relation to the motors and the current request signal.

26 Claims, 18 Drawing Figures

TRANSIT VEHICLE MOTOR EFFORT CONTROL APPARATUS AND METHOD

This is a continuation of application Ser. No. 709,821 filed July 29, 1976 now abandoned.

CROSS REFERENCE TO RELATED APPLICATIONS

The present application is related to the following concurrently filed patent applications which are assigned to the same assignee as the present application; and the respective disclosures of which are incorporated herein by reference:

Ser. No. 709,687, which was filed on July 29, 1976 by J. H. Franz and entitled Transit Vehicle Chopper Control Apparatus And Method;

Ser. No. 709,686, which was filed on July 29, 1976 by L. W. Anderson, J. H. Franz and T. C. Matty and entitled Transit Vehicle Motor Operation Control Apparatus And Method;

Ser. No. 709,685, which was filed on July 29, 1976 by L. W. Anderson and J. H. Franz and entitled Transit Vehicle Generated Voltage Control Apparatus And Method; and Ser. No. 709,684, which was filed on July 29, 1976 by T. C. Matty and J. H. Franz and entitled Transit Vehicle Electrical Brake Control Apparatus And Method.

BACKGROUND OF THE INVENTION

The present invention relates to the application of thyristor chopper apparatus for determining the propulsion power and electric brake operations of a transit vehicle having series propulsion motors, and more particularly to control apparatus including a microprocessor that is programmed for the desired control of such thyristor chopper apparatus.

Direct current power has been supplied to the series propulsion motors of a transit vehicle with a thyristor chopper, such as disclosed in U.S. Pat. No. 3,530,503 of H. C. Appelo et al, for controlling the acceleration and speed of the vehicle by turning the propulsion motor current ON and OFF in a predetermined pattern. The thyristor chopper can provide either regenerative braking or dynamic braking when braking is desired.

In an article entitled Automatic Train Control Concepts Are Implemented By Modern Equipment published in the Westinghouse Engineer for September 1972 at pages 145 to 151, and in an article entitled "Propulsion Control For Passenger Trains Provides High Speed Service" published in the Westinghouse Engineer for September 1970 at pages 143 to 149, there is described the operation of the P signal for controlling all powered vehicles in a train to contribute the same amount of propulsion or braking effort.

In an article entitled Alternative Systems For Rapid Transit Propulsion And Electrical Braking, published in the Westinghouse Engineer for March, 1973, at pages 34-41, there is described a thyristor chopper control system for propulsion and electrical braking of transit vehicles. The thyristor chopper provides a propulsion system that is superior in smoothness and ease of maintaining a given speed, which latter feature is desired for automatic train control. Moreover, the thyristor system makes regenerative braking practical because the response is fast enough to continuously match regenerated voltage to line voltage, and that matching prevents excursions in braking current and torque due to sudden transients in line voltage. The reduction in power consumption that results from regenerative braking can be significant, but another advantage is in relation to minimizing heat input to tunnels otherwise caused by dynamic braking.

The use of presently available microprocessor devices, such as the Intel 8080 family of devices, is described in a published article entitled "Microprocessors-Designers Gain New Freedom As Options Multiply" in Electronics Magazine for Apr. 15, 1976 at page 78 and in a published article entitled "Is There A High-Level Language In Your Microcomputer's Future?" in EDN Magazine for May 20, 1976 at page 62.

SUMMARY OF THE INVENTION

An effort control apparatus and method are provided for an electric motor, such as a direct current series propulsion motor used with transit vehicles, through the operation of an effort control parameter RE which influences the armature current of the motor in relation to one or more operational conditions such as a drop in the power supply line voltage, the supply line current is greater than a predetermined limit or reference value, the load weighed current request becomes greater than the supply line voltage and the supply line voltage becomes greater than any one or more of a provided plurality of successively larger predetermined limits or reference values. The effort control parameter is provided with a minimum value limit and a maximum value limit.

DESCRIPTION OF A PREFERRED EMBODIMENT

Figure 1:
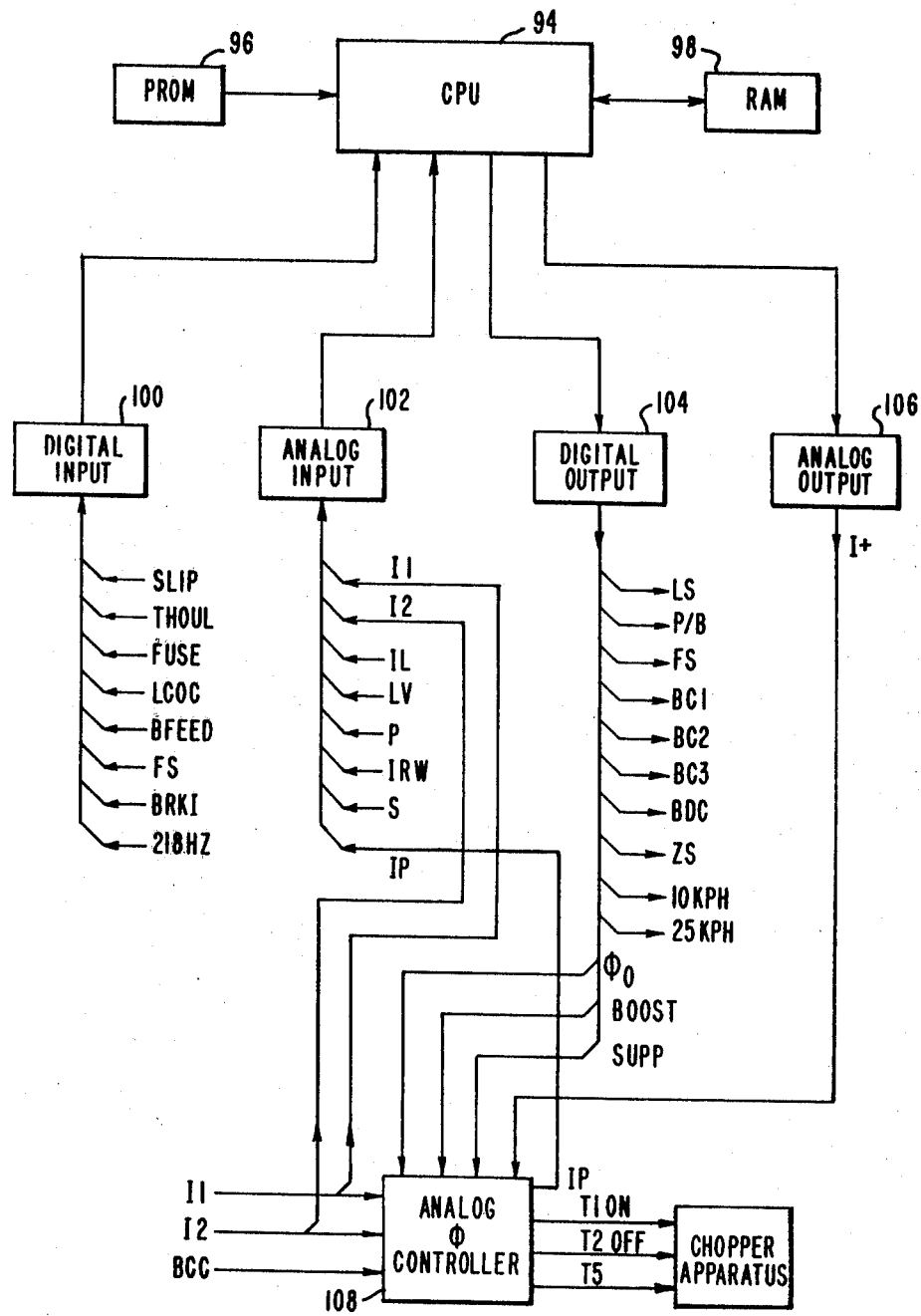
FIG. 1 is a functional showing of the present control apparatus in relation to the input signals and the output signals operative with the control apparatus.

In FIG. 1 there is shown a functional illustration of the present control apparatus in relation to the input signals and the output signals operative therewith, and including a CPU microprocessor 94 operative with a PROM programmable memory 96 and a scratch pad RAM random access memory 98 used for intermediate storage. The application program, in accordance with the program listing included in the Appendix, is stored in the programmable memory 96. The microprocessor 94 can be an INTEL 8080, the random access memory 98 can be an INTEL 8101, and the programmable memory 96 can be an INTEL 1702 programmable read only memory, which items are currently available in the open marketplace. There are four illustrated categories of input and output signals relative to the controlled process operation of a transit vehicle. The digital input signals are supplied through digital input 100 from the transit vehicle and include the slip slide signal SLIP, the thyristor temperature sensor thermal overload signal THOUL, the effective value of the line filter capacitor as indicated by the fuse counter signal FUSE, the power circuit condition indication signal LCOC, the power and brake feedback signal BFEED, the field shunt feedback signal FS, the brake status signal BRKI and the clock signal 218 Hz. The analog input signals are supplied through analog input 102 and include the first propulsion motor leg current I1, the second propulsion motor leg current I2, the line current IL, the line voltage LV, the primary power request or brake request control signal P, the air pressure in the vehicle support bag members provided load weighed current request signal IRW, the analog phase signal IP and the vehicle actual speed signal S1. The digital output signals are supplied through digital output 104 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the 10 kilometer per hour signal 10 KPH, the 25 kilometer per hour signal 25 KPH, the phase zero control signal $\phi_o$, the rate timing signal BOOST, the ON suppress control signal SUPP and the zero speed signal ZS. The analog output current request signal I+ is supplied through analog output 106 going to an analog phase controller 108 operative to supply the control signal ON to fire the chopper thyristor T1, the control signal OFF to fire the commutating chopper thyristor T2, the control signal T5 for the T5 thyristor in the propulsion motor control chopper apparatus and the analog phase indication signal IP going to analog input 102. The time period associated with turning the chopper ON and OFF is at a constant frequency of 218 Hz, that defines the clock time interval for the program cycle and for checking the process operation. During each of the 218 time intervals per second, the program cycle operates through the application program. It was necessary in the prior art for some of the input signals to be filtered to slow down the effects of noise transients and the like, but the computer program now samples the input signals 218 times every second, so if desired each signal can be checked during each program cycle and, if the signal stays the same as it was before, the proper response can be provided. By sampling all the input signals every program cycle and by addressing every output signal every program cycle, if noise transients are received, their effect can be minimized or eliminated. For the output signals, a correct output can be given 5 milliseconds later and faster than the power response time of a train vehicle. For the input signals, digital filtering by comparison with old data can eliminate transient effects.

The train control system operative with each vehicle provides a P signal which selects a desired propulsion effort and this signal, as will be described in relation to FIG. 15, goes from 0 to 100 milliamps and establishes how much propulsion power or braking effort is desired by a particular train vehicle. The P signal is decoded to determine the proper motor current to generate the proper effort. In addition, there is a confirming signal, called the BRKI signal which determines when propulsion power and when braking effort is applied. The purpose of the BRKI signal is to control the power switching at the correct time to avoid one car braking while another car is in propulsion. Contact closures in the power circuitry are detected to establish that the power contacts have been made up properly and to readjust the settings in the logic. For instance, in field shunt operation, the amount of motor current is adjusted to keep from getting an undesired physical jerk of the vehicle. A failsafe reading of the P signal level is made such that, should the P signal be lost, the train control automatically goes into a brake mode. The present propulsion control apparatus determines which switches to close and when to close them to modify the power circuit properly. A dynamic brake feedback signal is sent to the mechanical brake control for providing the blending of mechanical brake necessary to maintain the deceleration level required by the P signal. The P signal is in reality a vehicle acceleration or deceleration request.

The propulsion control apparatus provides output pulses to the main power thyristors to tell them when to turn ON and when to turn OFF. When a command signal is sensed, for example, if the vehicle is in propulsion or power mode and the command signal desires the vehicle to brake, the control apparatus senses any difference between the desired motor current and the actual motor current and ramps down the actual current as required. When the current gets down to a desired level, the control apparatus opens all the propulsion switches and reconnects for a brake operation, then ramps the motor current back up again to the level established by the desired brake operation.

Figure 2:
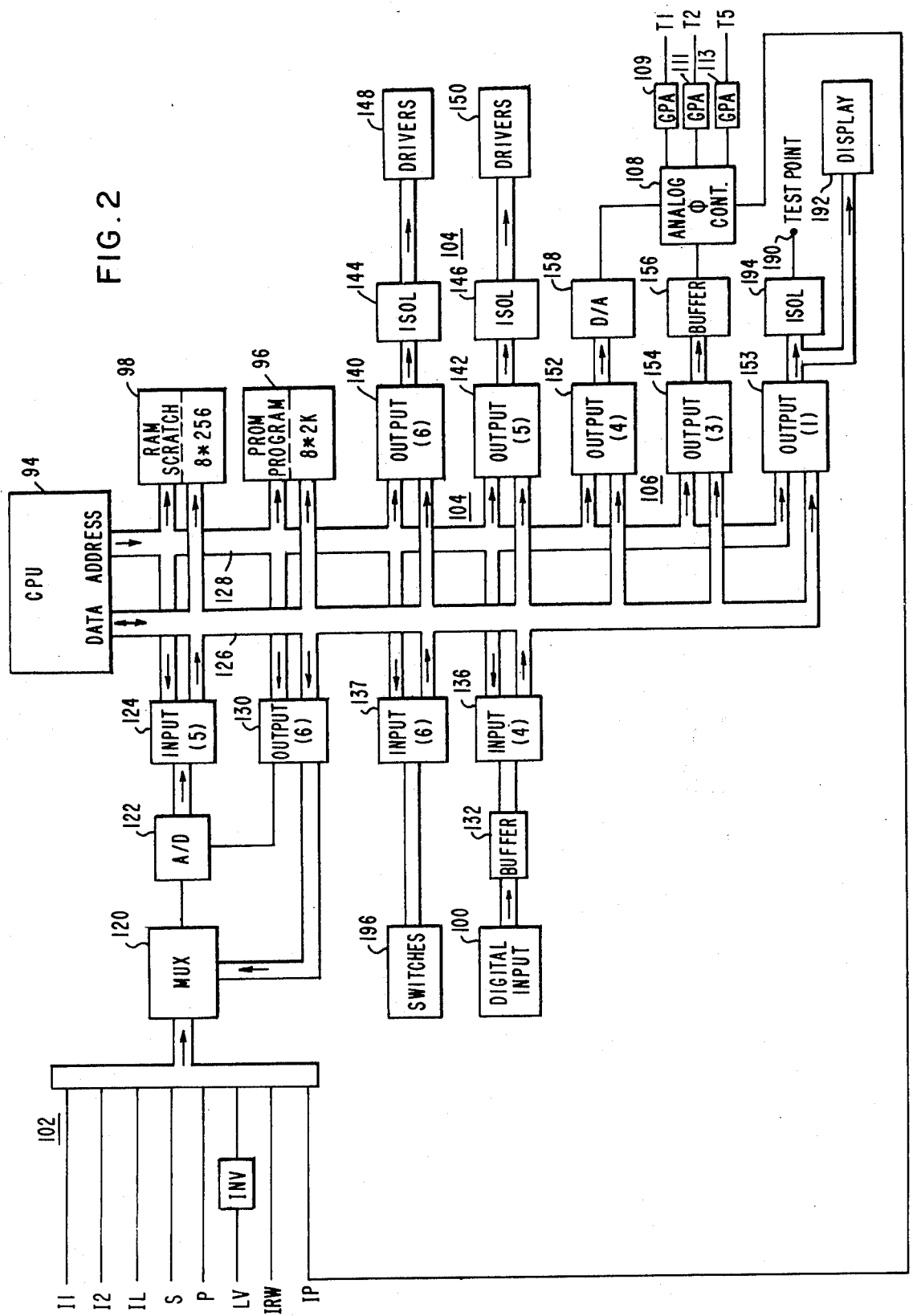
FIG. 2 illustrates the input signal operations and the output signal operations of the present control apparatus.

In FIG. 2 there is illustrated the input signal operations and the output signal operations of the present control apparatus, including the microprocessor 94 operative with its random access memory 98 and its programmable memory 96. The analog input signals are supplied through the analog input 102, through the multiplexer 120 and analog-to-digital converter 122 and input port 124 of the microprocessor 94 operative with a data bus 126 and address bus 128. The address bus 128 and data bus 126 are operative through an output port 130 to control the multiplexer 120 and the analog-to-digital converter 122. The digital input signals are supplied through the digital input 100 operating through buffer 132 with the input port 136 operative with the data bus 126 and the address bus 128. The digital output signals are supplied through digital output 104 including output ports 140 and 142 and respective isolation circuits 144 and 146 with drivers 148 and 150 in relation to the data bus 126 and the address bus 128. The analog output 106 is operative through output ports 152 and 154 through a buffer 156 and a digital-to-analog converter 158 with the analog phase controller 108.

The central processor 94 addresses a particular input port or output port or memory location and then transmits data to or receives data from that location on the data bus 126. For example, the central processor 94 can address an input port, such as input port 124 for the analog-to-digital converter 122 and the multiplexer 120. First it presents data to output 130 to tell the multiplexer 120 which analog circuit input signal is desired. Each analog signal has some sort of buffering, such as a differential amplifier or a low pass filter. When the particular input is addressed, the analog-to-digital converter 122 cycles for converting that data. The digital feedback signals from the digital feedback 100 comes in and can be read whenever desired. A monitor or display panel 192 can be provided to indicate the state of operation of the central processor 94. The output port 153 is operative through digital-to-analog converter and buffer amplifier 194 with the provided test point 190 and is operative with display 192. The manual switches 196 are operative with the input port 137 as shown.

The P signal goes through the multiplexer 120 to request a particular vehicle operation. The control processor 94 senses the various currents, the various voltages and the vehicle speed. It takes digital feedback signals through buffers to know what is going on in the power circuit in relation to currents and voltages. The control processor 94 provides output command signals to the power circuit. Command signals go on the data bus and output ports function as latches so the control processor 94 can proceed to do other things while each latch remembers what is on the data bus at a given address. The control processor 94 outputs a signal to close whatever power switches are desired and also outputs a requested motor current. The requested motor current is decoded in a digital-to-analog converter. The analog motor control circuit, in response to this current request, senses the actual motor current and the commutating capacitor voltage, and if everything is satisfactory, the motor control circuit appropriately fires the drivers for the chopper apparatus.

Figure 14:
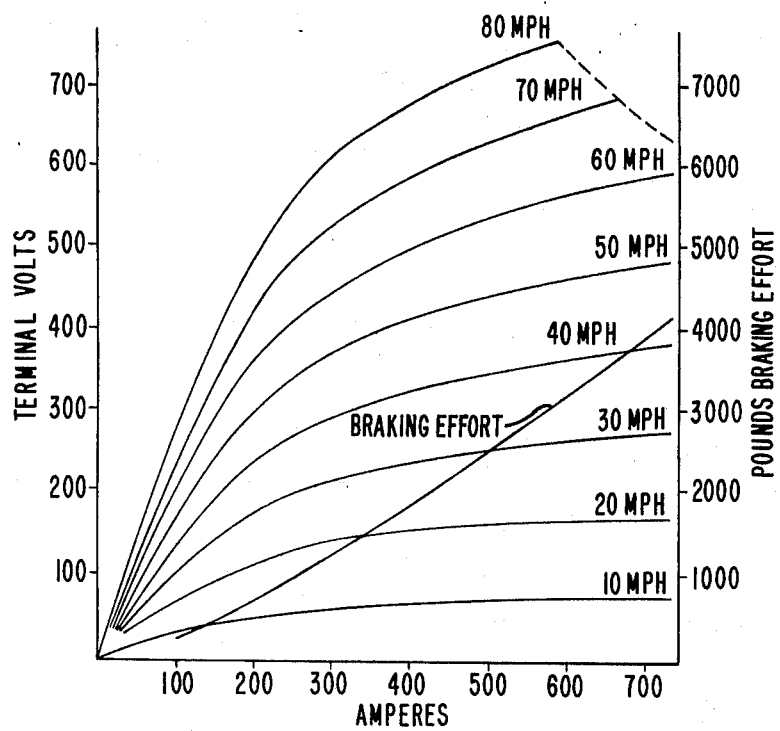
FIG. 14 shows a well known operational characteristic curve for a typical series propulsion motor operative with a train vehicle and the present control apparatus.

In relation to effort versus motor current, at up to about 100 amps, a typical series propulsion motor as shown by FIG. 14 provides little practical effort, and above 100 amps the characteristic looks more or less like a straight line. As speed increases, there is wind resistance, so the effective effort available is actually less in power, and in braking, the reverse is true. When power is requested, the motor current comes up to the level requested by the P signal at a jerk limited rate. The vehicle increases its speed because of the effort supplied. The phase increases with speed, and when the phase approaches almost 100%, the full field operation is completed and the field shunt is used to weaken the motor field, and this provides a transient response problem; a very fast controller is required, such that it can properly control the phase on the thyristors. In actual practice, propulsion power is easier to control because in power a particular phase angle sets a percentage of line volts on the motor, and this will give a particular amount of motor current, such that if the phase is set at 50%, a particular amount of current is provided in power operation for a given speed. In brake operation, this same relationship is not true since brake operation is more unstable. If the phase is held at a desired place in power operation, the motor current is stable; if a particular phase setting is held in brake operation, the motor may go to overload or to zero. If it is desired to initiate brake operation, the control apparatus has to command brake which ramps down the motor current on a jerk limit, then opens up the power switches and reconnects the power switches for brake operation; thereafter, the control apparatus goes into brake operation and ramps up the motor current to give the torque necessary to get the desired brake effort. The motor may be generating a considerable voltage that goes back into the supply line so a resistor is put into the circuit to dissipate the excess voltage. As the vehicle comes down in speed, the motor counter EMF drops and the chopper can no longer sustain the motor current, so switches are operated to change the resistors to maintain the desired motor current. If the line voltage exceeds a particular value to indicate that the line is not receptive and will not accept the generated current, the motor current is reduced if no dynamic braking resistor is used with dynamic resistors in the circuit, if the line voltage becomes excessive, the motor current is shunted into the dynamic braking resistor.

Figure 3A:
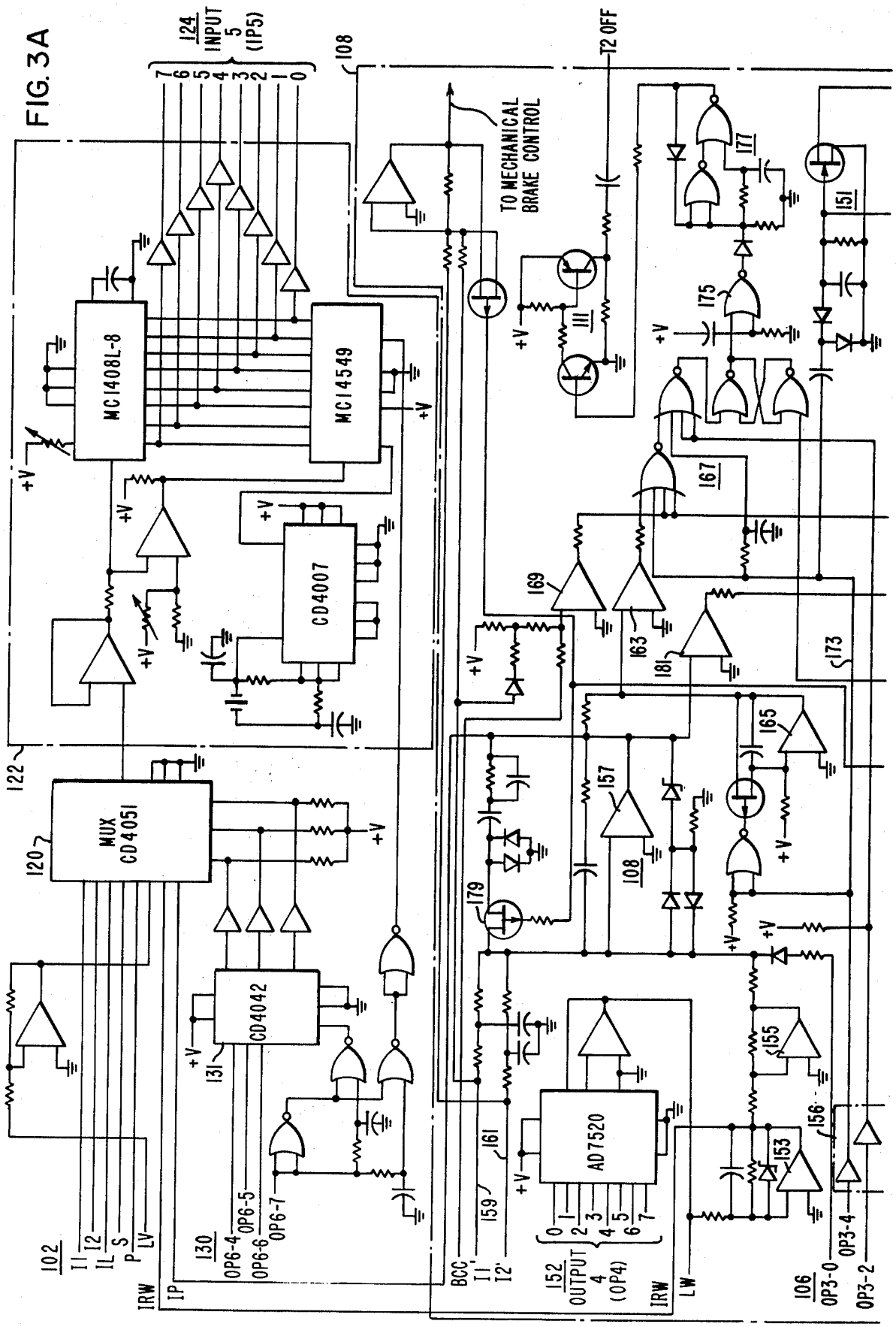
FIGS. 3A and 3B illustrate schematically the provided interface of the present control apparatus.
Figure 3B:
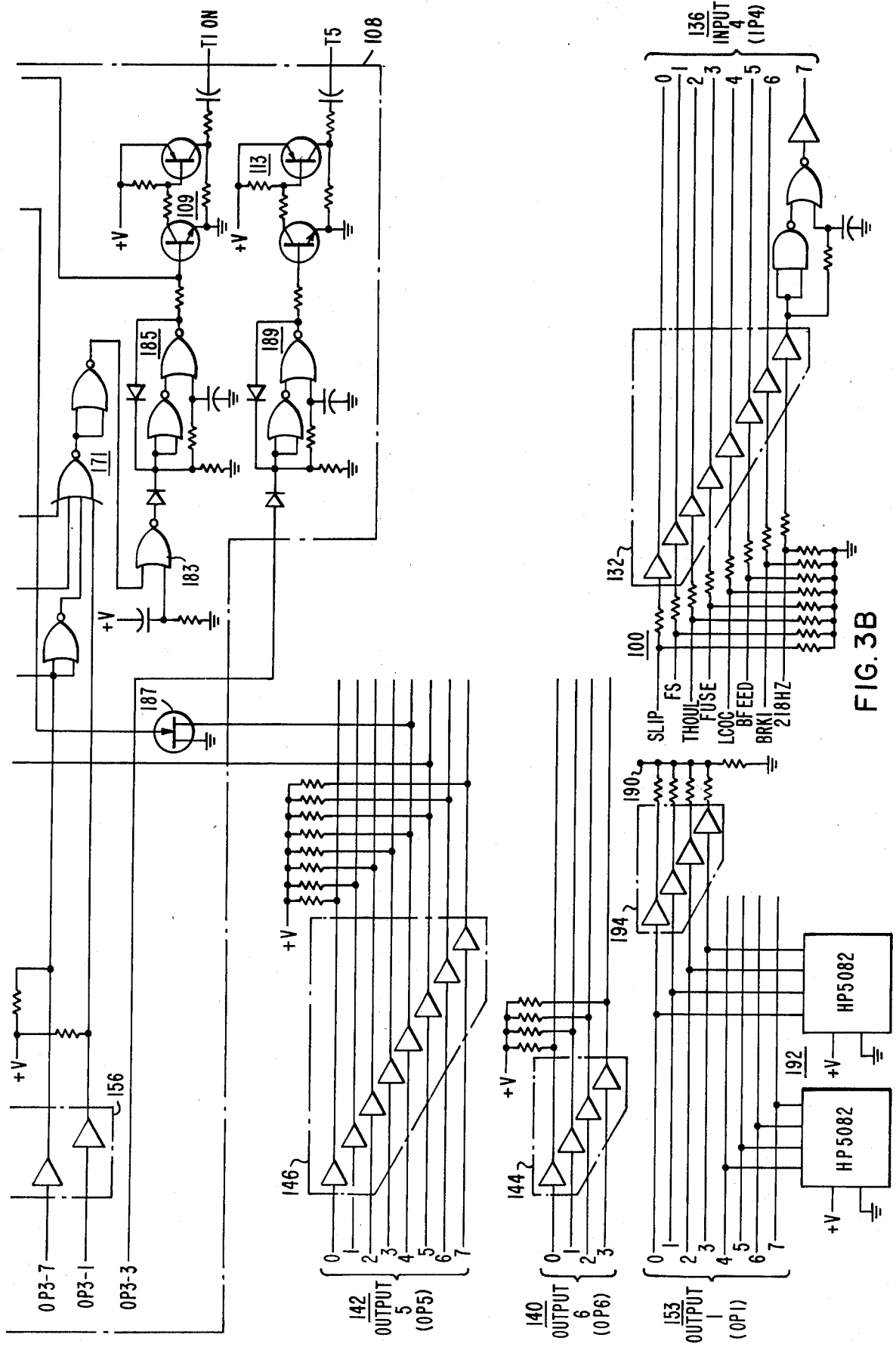

In FIGS. 3A and 3B there is schematically illustrated the provided interface of the present chopper logic control apparatus. The digital input 100 is shown in FIG. 3B operative through the buffers 132 with the input port 136. The analog input 102 is shown in FIG. 3A operative through multiplexer 120 and the analog to digital converter 122 with the input port 124 of the microprocessor. The output port 130 is operative with the register 131 to control the multiplexer 120 and the analog to digital converter 122. The output port 152 is shown in FIG. 3A operative with the digital to analog converter 158 and the analog phase controller 108; the output port 106 is shown in FIGS. 3A and 3B operative through buffer amplifiers 156 with the drivers 109, 111 and 113 for controlling the respective thyristors T1, T2 and T5. The output port 142 is shown in FIG. 3B operative with the isolation amplifiers 146. The output port 140 is shown in FIG. 3B operative with the isolation amplifiers 144. The output port 153 is shown in FIG. 3B operative with isolation amplifiers 194 and test point 190 and operative with display 192.

The pump circuit 151 operates to verify the proper working of the present control apparatus including the microprocessor 94 before the line switch is picked up and the desired propulsion motor control operation takes place. A dummy boost signal is initially put out at program line 16 to enable the line switch to be picked up, and during the main program operation if something goes wrong the boost signal disappears and the line switch drops out. The Y shown in FIG. 10 has added to it the boost bit, and then time is called to wait as shown by the code sheet; the Y carrier indicates whether the OFF suppress or the ON suppress is called for.

The load weighed current request signal is output by amplifier 153. Then the buffer 155 leads to the phase controller amplifier 157, which takes the current request signal from buffer 155 and the motor current signals I1 and I2 from lines 159 and 161. The output of controller amplifier 157 is the requested OFF pulse position or the phase angle IP. The output of the amplifier 157 is compared by comparator 163 with the timing ramp from amplifier 165 which is reset by the computer each 218 Hz. The comparator 163 establishes when phase angle signal IP has exceeded the timing ramp, and this would determine at the output of comparator 163 where the OFF pulse is positioned. The logic block 167 determines whether or not the OFF pulse position output of comparator 163 is actually used. For example, if comparator 169 determines there is too much current in the system, the OFF pulse will be fired and might inhibit or suppress the ON pulse in logic block 171 which is operative with the ON pulse. The boost pulse comes from the computer and goes into the logic block 167 on line 173, and will fire an OFF pulse on the leading edge if comparator 169 has not already fired a pulse and suppress any further action out of the control system. The logic block 167 includes a flip-flop operative such that if an OFF pulse is fired once during a given program cycle, a second OFF pulse is not fired during that same program cycle. The power up restart circuit 175 suppresses pulses until the control system has time to operate properly. The circuit 177 is a monostable to assure that only a pulse is output, and circuit amplifier 111 drives the OFF pulse going to the gated pulse amplifier for thyristor T2. In power mode the FET switch 179 is closed to provide the desired motor characteristics compensation signal, and in brake mode, this switch is opened to provide a faster controller operation. The amplifier 181 checks the phase controller 157 to see if the signal IP is all the way up against the bottom stop to indicate too much current, and if so, the circuit 171 suppresses the ON pulses; this is used when starting up in power to skip ON pulses. The ON pulses are suppressed by the power up circuit 183. The ON pulses use the monostable 185 and the driver 109 as in the operation for the OFF pulses. The safety enable signal or pump circuit 151 will stop the firing of an ON pulse if repetitive boost signals are not provided. The FET switch 187 energizes the line switch output, such that if there is no activity on boost signal line 173, then the pump circuit 151 will cause FET switch 187 to keep the line switch dropped. The T5 signal comes from the computer to fire the T5 thyristor, and monostable 189 drives the driver circuit 191 going outside to the gated pulse amplifier for the T5 thyristor. The phase controller 108 includes the operational amplifier 157, with its attendant compensation for power and brake operations. The computer can force the controller 108 from output port 3-0 to zero for startup. The pumping circuit 151 checks the activity of the computer by looking at the boost line 173 for snubbing the provision of ON pulses and thereby controls the line switch. If the line switch is out, the propulsion and brake control system cannot operate the chopper apparatus, so if something is wrong, it is important to snub the ON pulses quickly, because the line switch takes time to drop out; for this reason an effort is made to stop the ON pulses when some control apparatus malfunction occurs and is sensed by the boost signals no longer being provided.

Figure 4A:
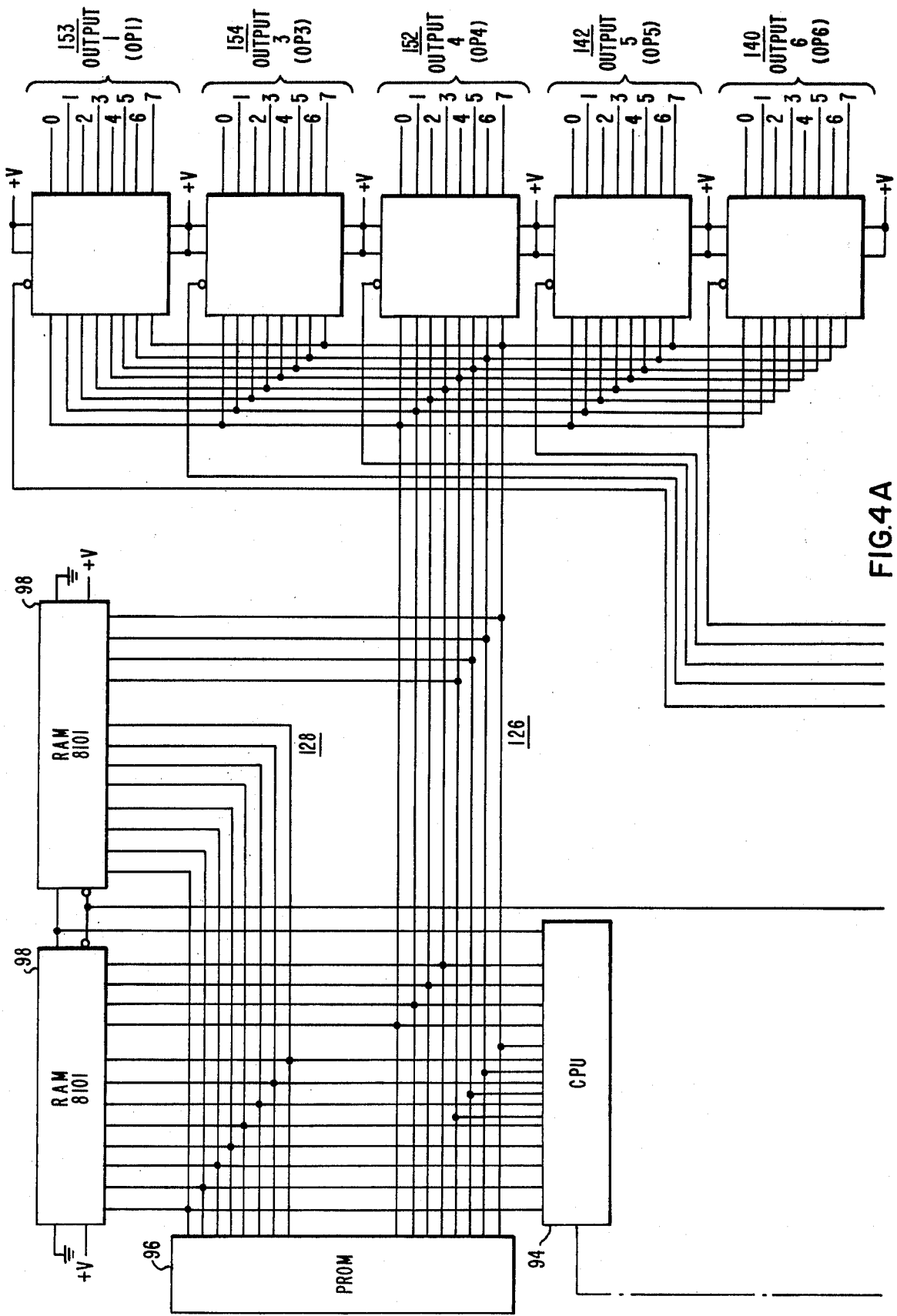
FIGS. 4A and 4B illustrate schematically the provided interface between the present control apparatus and the controlled transit vehicle.
Figure 4B:
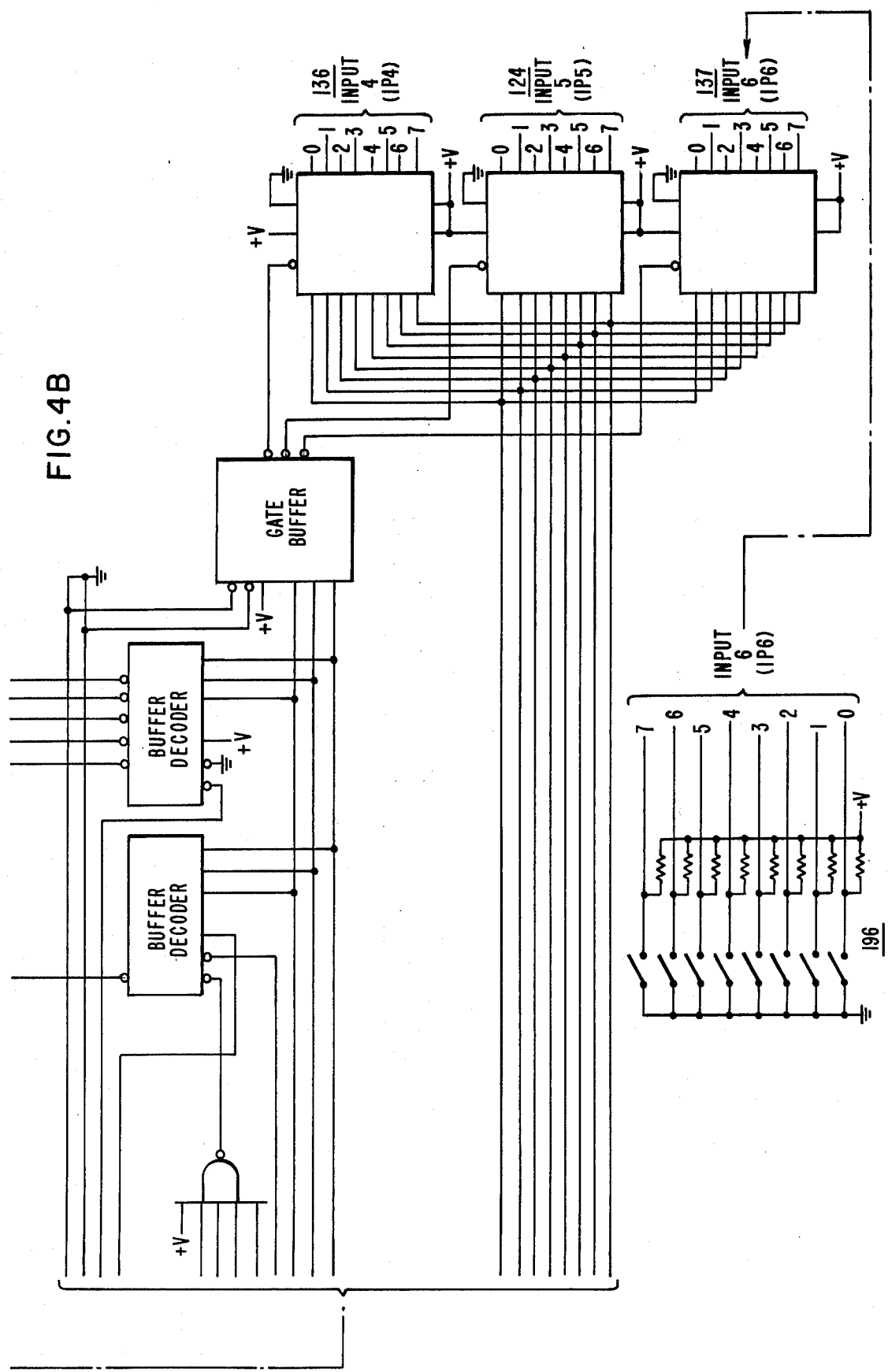

In FIGS. 4A and 4B there is schematically illustrated the provided interface of the present chopper logic control apparatus. In FIG. 4A there is shown the microprocessor 94 operative with the data bus 126 and the address bus 128 and the random access memory 98 and the programmable memory 96. The output ports 153, 154, 152, 142 and 140 are shown in FIG. 4A. The input ports 124, 136 and 137 are shown in FIG. 4B, as well as the manual switches 196 operative with the input port 137.

Figure 5:
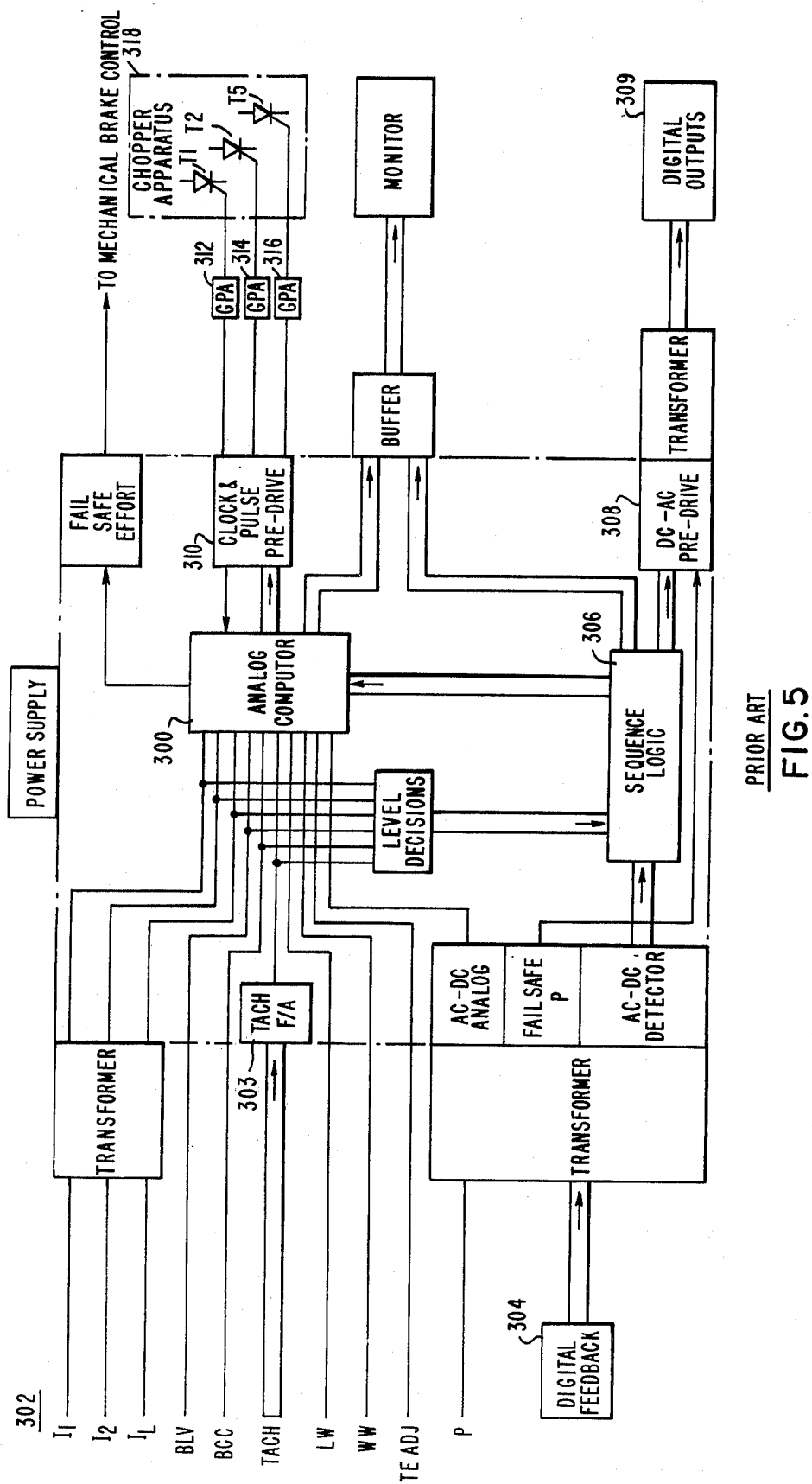
FIG. 5 illustrates a prior art chopper logic control apparatus.

In FIG. 5 there is illustrated a prior art chopper logic control apparatus including an analog computer 300 operative with analog input signals provided through analog input 302, with the tachometer signal passing through a frequency to analog converter 303 before going to the analog computer 300, with digital input signals provided through digital input 304 passing through digital hard-wired sequence logic 306, with the digital outputs passing through the DC to AC predrive circuit 308 and the relay drivers 309. The clock and pulse predrive circuit 310 supplies the ON, the OFF and the T5 control signals through the respective gate pulse amplifiers 312, 314 and 316 for controlling the respective thyristors in the chopper apparatus 318.

Figure 6:
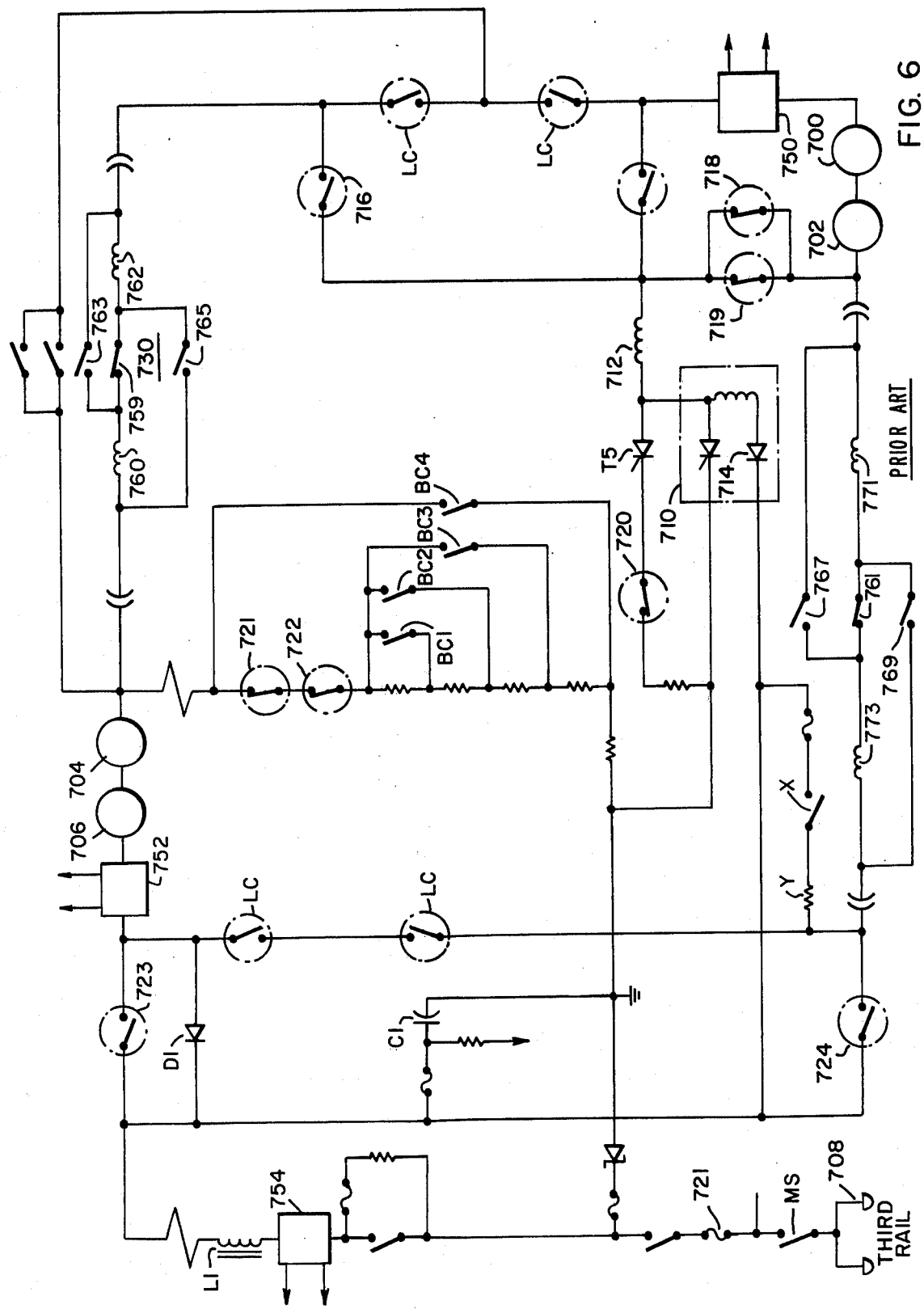
FIG. 6 illustrates schematically a prior art motor operation control apparatus.

In FIG. 6 there is shown a schematic illustration of a well-known prior art motor operation control apparatus operative at the present time in Sao Paulo, Brazil, as described in the above-referenced March 1973 published article, with series propulsion motors and including a thyristor chopper. A first pair of series motors 700 and 702 and a second pair of series motors 704 and 706 are energized in parallel from the third rail connection 708.

Figure 7:
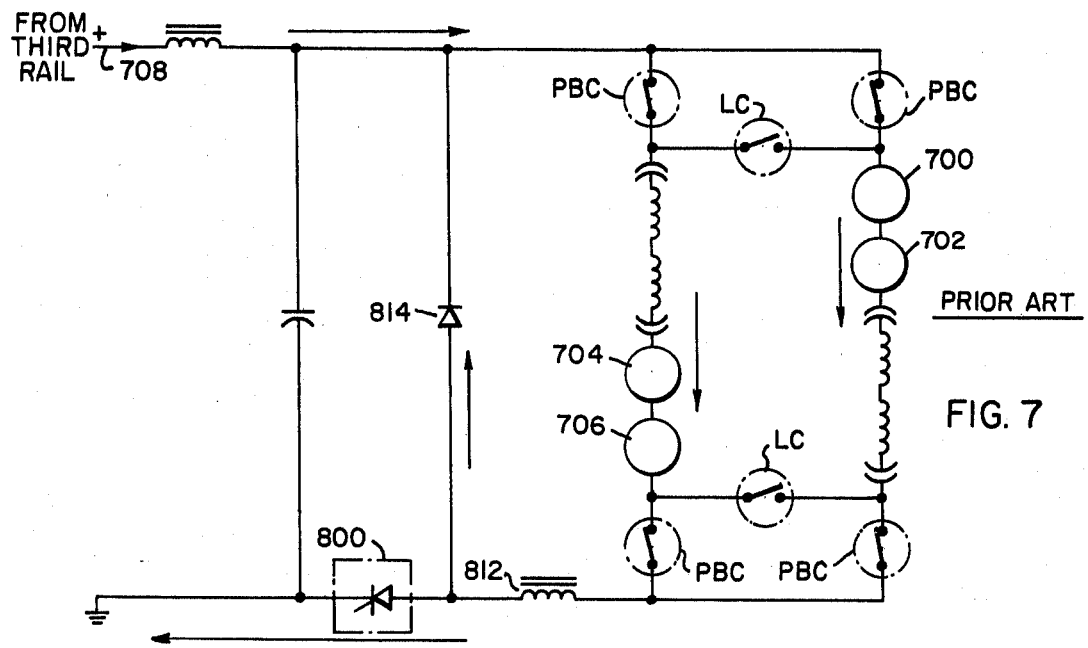
FIG. 7 illustrates schematically a prior art motoring mode of operation of the motor operation control apparatus of FIG. 6.

FIG. 7 illustrates the well-known motoring mode of operation of the motor operation control apparatus shown in FIG. 6. The chopper 800 is used to regulate the current in the motor circuits. Turning the chopper 800 ON builds up current in the motors 700, 702, 704 and 706 by completing the circuit from the DC power supply positive 708 through the motors to ground. When the chopper 800 is turned OFF, the energy stored in the motor reactor 812 and the inductance of the motors maintains current flow in the motor circuit through the loop formed by the free-wheeling diode 814. The average voltage applied to the motors is controlled by adjusting the ratio of chopper 800 OFF time to ON time. This adjustment is made by the chopper control logic to maintain the desired average motor current and the corresponding motor torque. When operating with full voltage applied to the motors, the chopper 800 switches at the normal frequency of approximately 218 Hz with an OFF interval of about 6% of the total cycle time.

Figure 8:
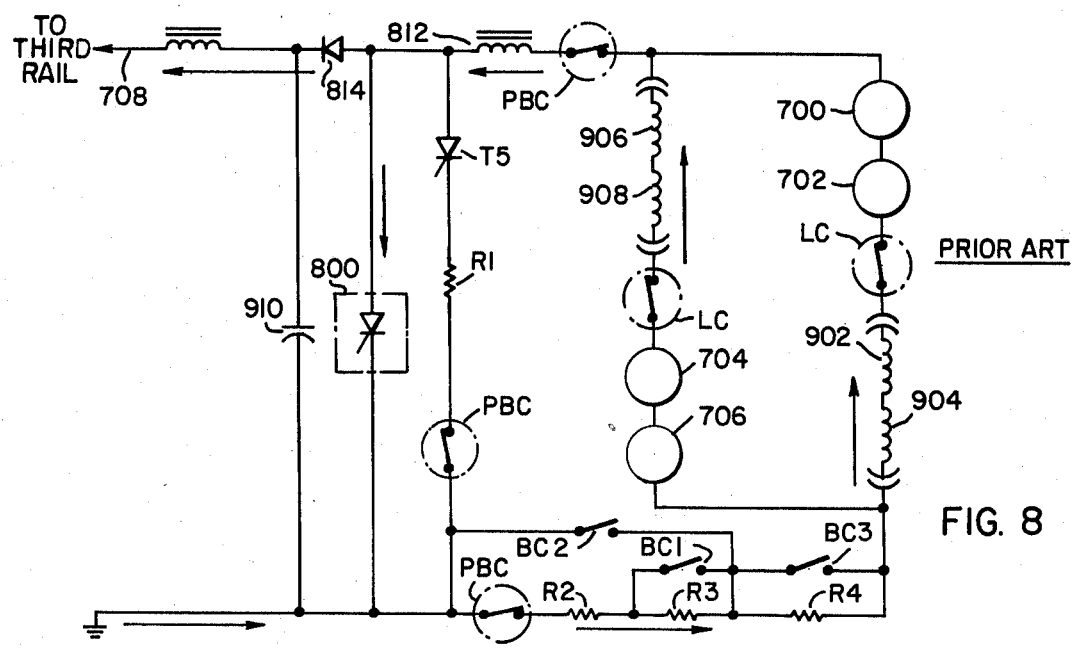
FIG. 8 illustrates schematically a prior art braking mode of operation of the motor operation control apparatus of FIG. 6.

FIG. 8 illustrates the well known braking mode of operation of the control apparatus shown in FIG. 6, where the motors 700, 702, 704 and 706 are reconnected by means of a power brake changeover PBC. The circuit is arranged for regenerative or dynamic braking with the motors operating as self-excited generators. The fields 902, 904, 906 and 908 are cross-connected to force load division between the paralleled generators. In regenerative braking the chopper ON and OFF ratio is regulated to maintain the desired current, with the more current providing the more braking. When chopper 800 is turned ON, the current in the motors increases. When the chopper 800 is turned OFF, the current flowing in the chopper 800 is forced into the line 708 through the free-wheeling diode 814 by the motor reactor 812. The logic system for control of the chopper 800 during braking also monitors the voltage across the line filter capacitor 910, and controls the chopper ON and OFF ratio in such a manner as to prevent the capacitor 910 voltage from exceeding the line voltage 708, a condition that could result in increasing current during the chopper OFF time and loss of braking control. If the capacitor 910 voltage during regeneration reaches a preset limit, the logic removes regenerative braking by turning the chopper 800 OFF and keeping it OFF, with the remainder of the braking being achieved by friction brakes. The DC series motor acts as a series generator and inherently has a maximum generated voltage approximately twice the line voltage. To provide for the maximum energy regeneration, resistors R2, R3 and R4 are connected in series with the motors and the line by the power brake changeover PBC. The IR drop across the resistors opposes the generator voltage so that the voltage across the capacitor 910 does not exceed the voltage of supply line 708. As speed is reduced due to braking, the voltage of the series generator drops. When the ON and OFF ratio of the chopper 800 reaches the point where the OFF time is a minimum in order to maintain the motor current at the desired average value, the logic system triggers pickup of one of the shorting contactors BC1, BC2 or BC3, which reduces the IR drop in series with the generators in order that the chopper 800 can continue to maintain substantially the same average braking current. The chopper 800 shifts from a minimum OFF condition to a minimum ON condition whenever a shorting contactor is picked up. In normal train operation regeneration of power into the power supply sometimes is not possible because of a dead third rail, loss of third rail power in the car or the absence of load being taken from the third rail. In that event the circuit consisting of thyristor T5 and resistor R1 provides almost instantaneous shift from regeneration to dynamic braking. The logic that controls the braking current makes the decision at the time of each ON pulse as to whether T5 only will be turned ON or the chopper 800 also will be fired. If the logic determines that the power supply is not receptive to regenerated energy, the chopper 800 is not turned ON and only T5 is gated to divert the motor current through the resistor R1. At the time of the next fired ON pulse the logic again determines the need to fire the chopper 800 on the basis of power supply 708 receptivity. Only when the line 708 again becomes receptive will the chopper 800 be gated and permit the voltage generated to rise to the point where motor current again flows into the line 708.

Figure 9:
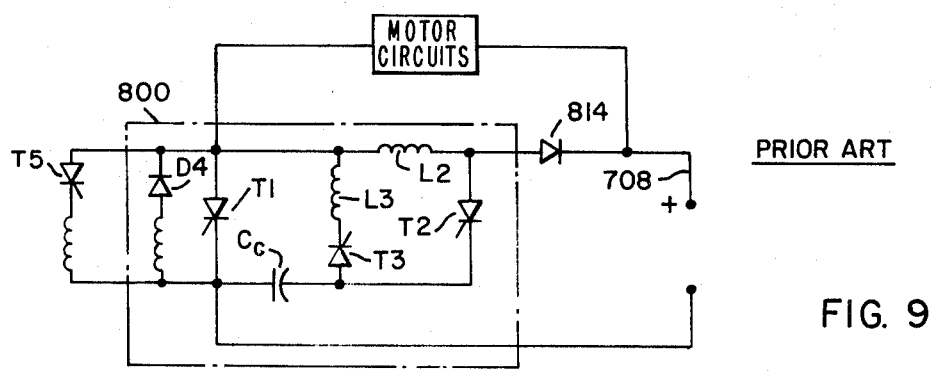
FIG. 9 illustrates schematically a prior art chopper apparatus.

In FIG. 9 there is illustrated a well known chopper apparatus, with the chopper 800 being shown connected in the motoring mode. The first OFF pulse controls the commutating thyristor T2 and the commutating capacitor $C_C$ charges to the same level as the line voltage; the capacitor $C_C$ would charge to twice the line 708 voltage due to its combination with the smoothing reactor L2 if it were not for the free-wheeling diode 814. When the voltage on the capacitor $C_C$ reaches line voltage level, the current through the capacitor $C_C$ and thyristor T2 goes to zero and the thyristor T2 turns OFF. An ON pulse now occurs, simultaneously turning ON the main thyristor T1 and the reversing loop thyristor T3. The load is then connected directly to the supply voltage 708 causing the motor current to build up. Also the voltage across the capacitor $C_C$ begins to decay as current flows through the thyristor T3, the reversing loop reactor L3 and the thyristor T1. The thyristor T3 turns OFF when the current reaches zero and the voltage on the capacitor $C_C$ has reversed completely. Current is now flowing in the load only and the circuit is ready for turn-off. Turn-off is accomplished by turning the thyristor T2 ON. The load current now flows through the thyristor T2 and the capacitor $C_C$. After a short delay due to the inductor L2, the thyristor T1 turns OFF and the diode D4 conducts to help speed the charging of the capacitor $C_C$. The reactor L4 limits the rate of rise of current in the diode D4, and diode D4 stops conducting before the capacitor $C_C$ charges to line voltage. When the capacitor $C_C$ is charged to line voltage, the free-wheeling diode 814 conducts current and the thyristor T2 turns OFF, leaving the circuit ready for another ON pulse and the start of another cycle. The basic operation is the same when the chopper is regulating current for motoring and for braking.

The T5 pulse controls the operation of the T5 thyristor used in the brake mode to switch in the auxiliary load resistor. When the power line is non-receptive to regenerated current, the T5 thyristor is switched to initiate dynamic braking. The braking resistors are shown as R2, R3 and R4 in FIG. 8, but there could be any number of series braking resistors provided, as desired. The zero ohm field shunt in the braking mode can be operated when it is desired to short the motor fields to try to kill all of the field current and the residual magnetization of the field; in the braking mode, the field may be shorted when desired in an effort to collapse a magnetic field of the motor to stop the car from electric braking when it is desired to instead utilize the mechanical brake. The failsafe brake effort is provided for energizing the vehicle mechanical brakes and an analog control signal IP is provided for this purpose because of the fail safety requirement.

Figure 10:
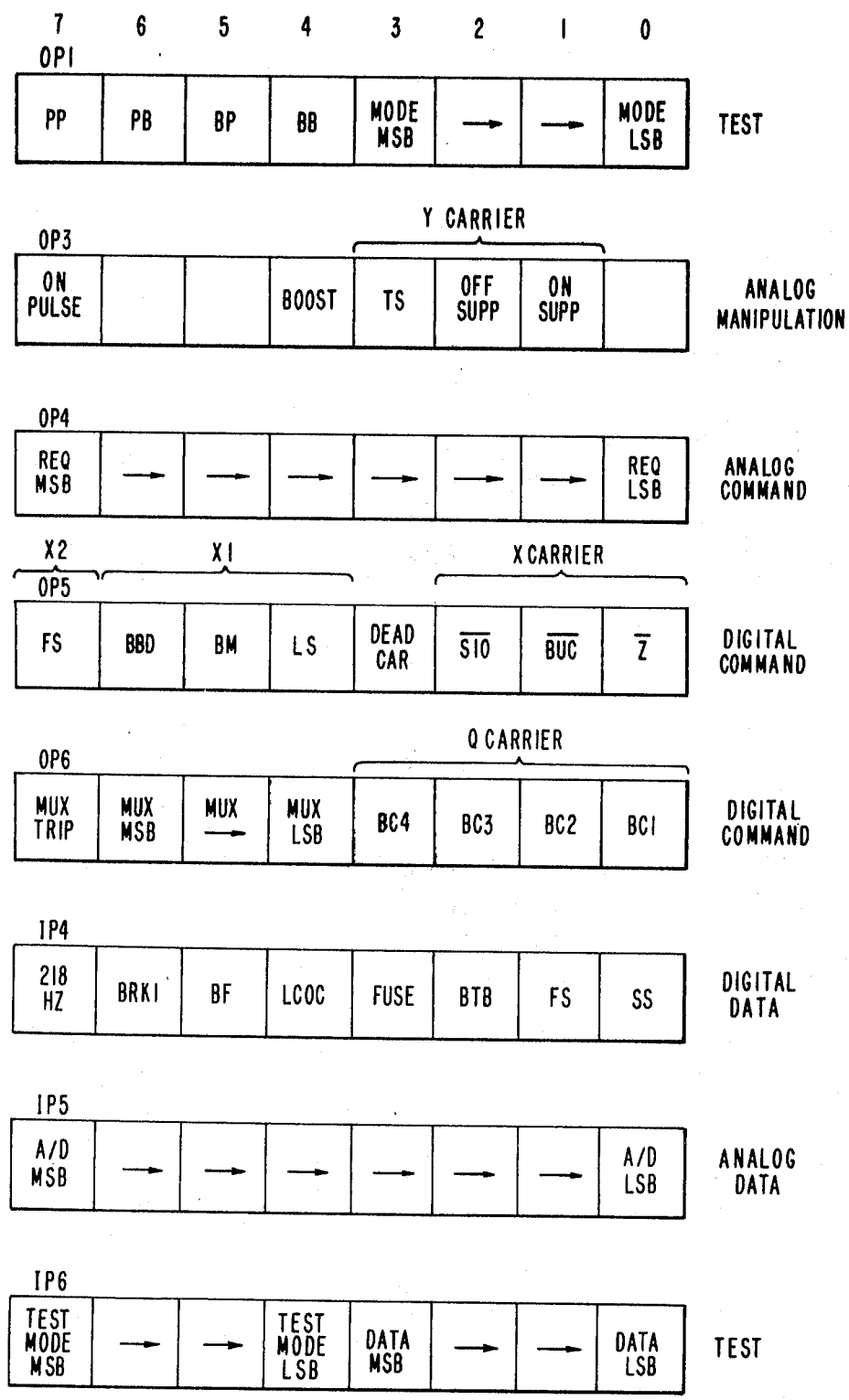
FIG. 10 illustrates the coding of the program listing included in the appendix.

FIG. 10 illustrates a code sheet that was used to develop the program listing included in the Appendix. As shown in FIG. 10 and in reference to FIG. 2, output port 1 (shown in FIG. 2 as 153) was used for a test mode, output port 3 (shown in FIG. 2 as 154) was used for analog manipulation, output port 4 (shown in FIG. 2 as 152) was used for analog command signal output, output port 5 (shown in FIG. 2 as 142) and output port 6 (shown in FIG. 2 divided into four bits each for 140 and 130) were used for digital command signal outputs, input port 4 (shown in FIG. 2 as 136) was used for digital input data, input port 5 (shown in FIG. 2 as 124) was used for analog input data and input port 6 (shown in FIG. 2 as 137) was used for test purposes in relation to manual input switches.

Figure 11:
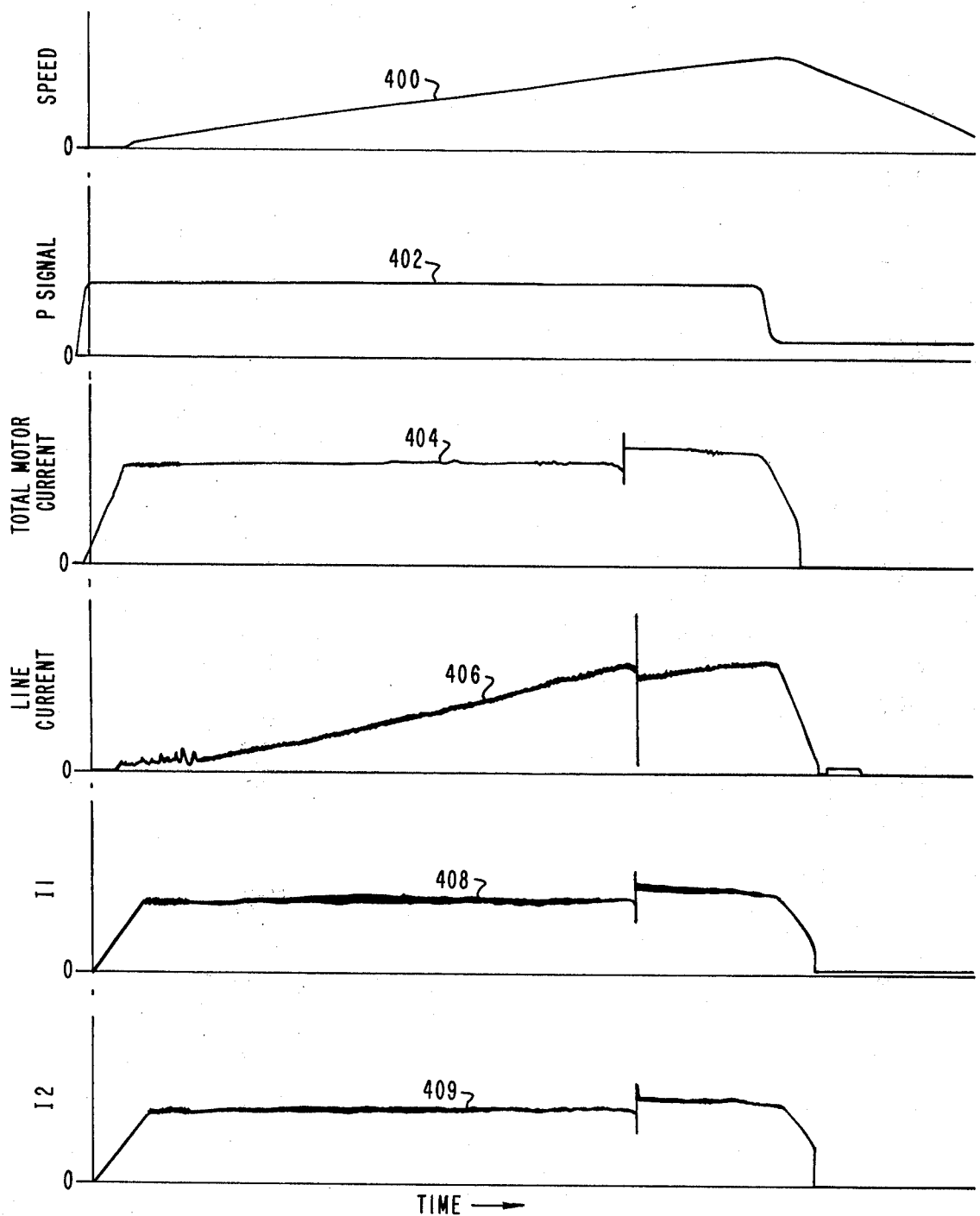
FIG. 11 shows a performance chart for a first actual operation of the present control apparatus with a two vehicle train and one vehicle not powered, for a normal power run without regenerative braking.

FIG. 11 illustrates a performance chart for the actual operation of the present control apparatus with the propulsion motors of a train vehicle for a normal power run. Curve 400 shows the speed of the vehicle in response to the P signal shown in curve 402. The curve 404 shows the resulting motor current and the curve 406 shows the resulting line current. Curve 408 shows an individual first motor circuit current sensed by a Hall current sensing device and curve 410 shows a second individual motor circuit current sensed by a Hall current sensing device. To illustrate that the current increases at a predetermined rate with a slight tilt to compensate for the losses in the motors, the abrupt step shown in the curves 404, 406, 408 and 410 illustrates where the field shunt operation took place. When the P signal drops, as shown by curve 402, the operation changes from power to brake. The charts shown in FIG. 11 are for a power run operation of two train vehicles, where one car was not powered and was pulled by the other powered car in an effort to lengthen the time response to see better what was actually taking place.

In FIG. 11, the top curve 400 is obtained as the derivative of speed, with the second half actually going negative. The bottom two curves 408 and 409 show the actual outputs of the two sensors 750 and 752 shown in FIG. 6. The control operation is shown in the power mode, dragging in effect one car, and shows a field shunt change, which changes the motor characteristics. When the vehicle starts operating in the motor mode the circuits are made up straight through the switches 759 and 761 shown in FIG. 6. When the field shunt operates to change the motor characteristics, the center switch 759 opens and the outer two switches 763 and 765 are closed to put half the current through each of the fields 760 and 762 in relation to motors 704 and 706 and the center switch 761 opens and the outer two switches 767 and 769 are closed to put half the current through each of the fields 771 and 773 in relation to the motors 700 and 702 to result in field weakening to change the motor characteristics. The microprocessor and the hall effect devices 750 and 752 combined with the high-speed analog controller 108 provides an improved control operation with less spiking action and this means the less prone the control is to respond to an abnormal fault condition. Any increase in the spiking action means a greater probability of blowing out fuses and the like and an increased possibility of sensing a false overload condition. There is energy wound up in this inductive circuit, and when there is a change in the motor characteristics such as operation of the field shunt, the motor current has to correspondingly change very rapidly.

Figure 12:
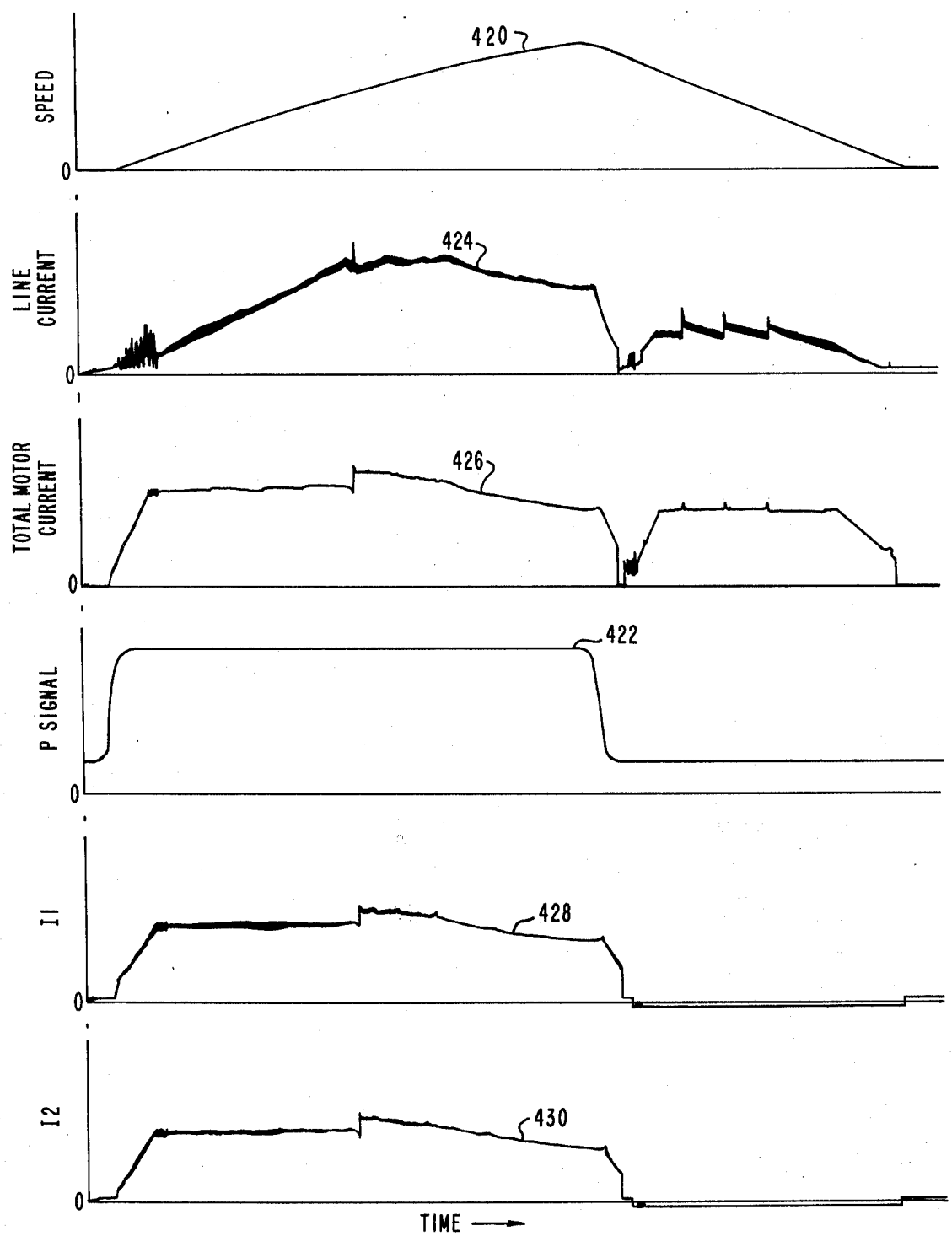
FIG. 12 shows a performance chart for a second actual operation of the present control apparatus with two vehicles when both vehicles are working together in power and in brake, for a fully receptive power supply line.

In relation to the performance curves shown in FIG. 12, the two cars were operative with a receptive line and both energized in power and in brake so they were working together in effect as a single car operation. The vehicle speed shown by curve 420, initially increases for acceleration and then decreases for deceleration in accordance with the P signal shown by the curve 422. The line current I2 is shown by the curve 424 as the train speeds up and then goes into the brake mode, the combined motor current is shown by the curve 426 and the individual first motor current I1 by the curve 428 and the second motor current I2 by the curve 430. When the P signal changes from power mode to brake mode, the spikes on the motor current curve 426 correspond to the closing of the various braking resistor switches.

Figure 13:
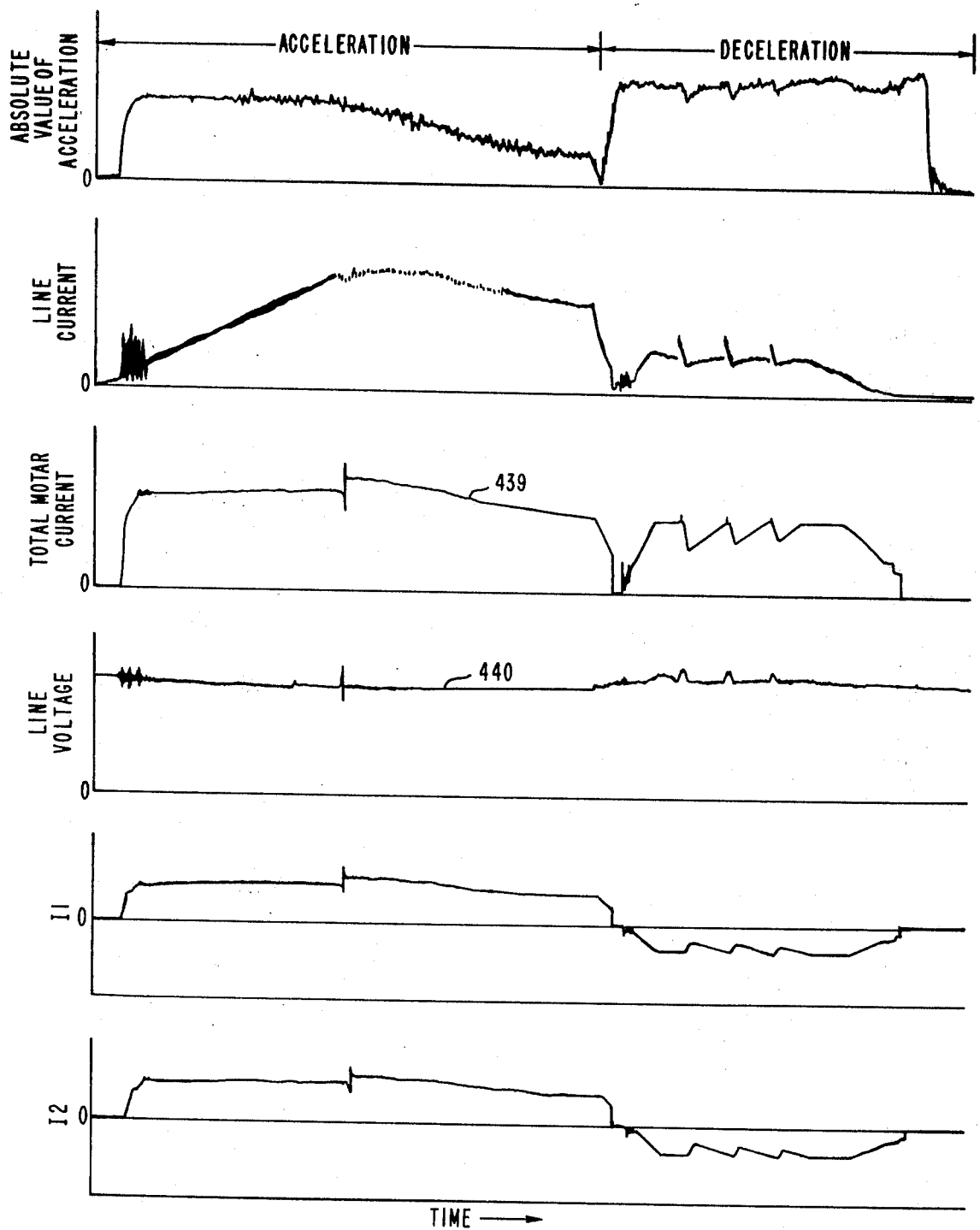
FIG. 13 shows a performance chart for a third actual operation of the present control apparatus with two vehicles working together in power and in brake, for a partially receptive power supply line.

FIG. 13 illustrates performance charts for the actual operation with a partially receptive supply line of the present control apparatus with a two vehicle train. These charts show the effects of trying to have a regeneration operation without the line being fully receptive. The curve 440 shows the line voltage. This is an effort during regeneration to put as much power back into the supply line as can be practically accomplished, and this is done by raising the line voltage up to a limit. The charts shown in FIG. 13 illustrate the superior performance of the present control apparatus including the microprocessor compared to prior art type of control logic apparatus for the reason that the computer program enables a better comparison of the line voltage with the generated voltage and a better control of cutting back the motor current each time the computer program cycles, which current is cut back by changing the ON-OFF ratio cycle of the chopper apparatus supplying the motor current. The prior art control apparatus cannot function in this way in that for each of the desired levels of action, depending upon the level of voltage, a different control circuit would be required.

In FIG. 14 there is shown a motor characteristic for a well-known series Westinghouse traction motor of Type 1463 operative through a 5.58 to 1 gear ratio with 30 inch vehicle wheels.

Figure 15:
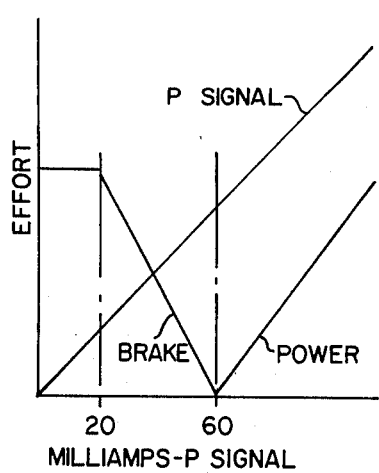
FIG. 15 shows the prior art response of a propulsion motor control apparatus to a P signal.

In FIG. 15 there is illustrated the well-known response of the propulsion motor control apparatus to the P signal 30. When the P signal 30 is below a value of about 60 milliamps, the control apparatus operates in the brake mode and for a P signal above this value of 60 milliamps, the control apparatus operates in the power mode.

Figure 16:
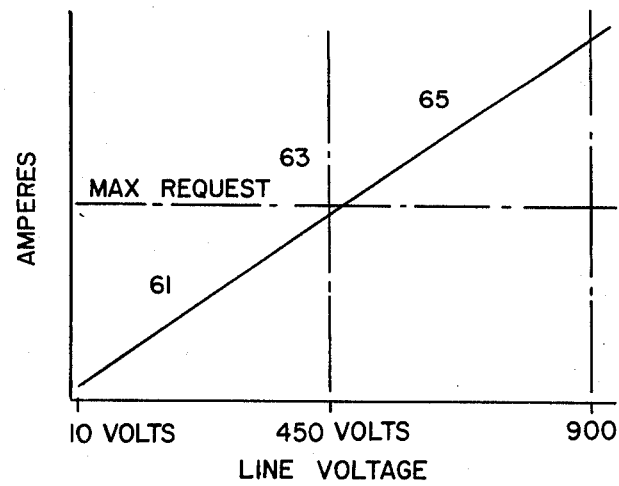
FIG. 16 illustrates the commutative capability of the typical chopper apparatus.

In FIG. 16 there is illustrated the commutative capability of a typical chopper apparatus. From a minimum level of about 10 amperes, there is a substantially linear characteristic relationship 61 between the line voltage and the commutation capability. The typical maximum requested current 63 is such that there is an excess capability 65 above this maximum requested current level 63. In the program line 134 the statement is made that anytime the current request IRW exceeds the line voltage then increase the retard effort parameter RE by two. At program line 14 if the line voltage is less than a determined minimum value, then go back to the beginning of the program is another condition provided for the control operation, otherwise the motors cannot obtain adequate current, there are commutation problems and so forth. As shown in FIG. 17, it is desired that the present control apparatus be operative with a line voltage between 450 volts up to about 900 volts, and with a current request below the determined maximum request level 63. As set forth in program line 134, the weighed current request is kept below the line voltage to enable proper commutation operation.

The program listing included in the Appendix is written in a language called PLM which was developed for use with the INTEL microprocessor, such as the central processor 94. This is a high level assembly language which can be compiled into machine language. The numbers used in the listing are in the hexadecimal number system, which is a base 16 number system. The first part of the listing in lines 1 to 6 is for bookkeeping purposes and identifies for the program the variables, the constants and the labels used in the course of the program. More specifically, K is an artificial constant that is set in the brake mode for controlling the brake buildup. IRW is the current request that has been load weighed to compensate for the weight of the car. I0 is the old current, I1 is one of the motor circuit currents and I2 is the other motor circuit current. IR is the current request. LVL is the modified line voltage. PR is the permission to regenerate. RE is the retard the effort due to a number of conditions such as overline voltage or overcurrent or the like. TI is a timer. IL is line current. LV is line voltage. M is the mode of the external equipment. M0 is the old mode and M1 is the transitory mode as determined by the mode request and the position of the power brake switch. N is a counter. PH is the phase that the external analog controller is controlling and that is brought back in to establish the field shunting. PI is the P signal that is used internally to do mode changes, PN is the new presently read P signal and P0 is the jerk limited P signal. TT is a timer. SI is the speed after the hysteresis has been applied. TOS is blank. ZI and Q are carriers to the external analog controller and establishes certain modes of operation. S is the currently read speed signal and SS is the speed signal after it has been modified for the taper on the power and brake modes. T is a timer, TP is a timer and TS is a timer. X, X1, X2, Y and Z are external controls for the analog controller. The three upper lines in the program listing are the variables used in the program. The next three lines are labels that identify in the program certain starting points where the program can jump to if needed. The compiler assigns memory locations for each variable, and any time a given variable is read, the computer knows the memory location. The mode labels are used to assign locations in the program.

The program defines the desired sequence of steps to be followed in controlling the propulsion and electric braking operation of a transit vehicle. The safe mode of operation is the brake mode. Therefore, the present control program listing always starts up through the brake mode. If an abnormal condition is detected, the program operation returns to the beginning and resequences through the brake mode. In comparison, the prior art control systems shut the chopper OFF and did not try to reinitialize the equipment or to make sure the start of the operation was always from the same base.

In line 8 and mode 1 of the program an output port is directed to take a certain state, which is output port 1, and the constant Q is initialized to equal zero. In lines 9 to 14 of mode 1 the program sets the output line switch out and checks if it is satisfactory and then reads the line voltage. The program looks at the inputs, the slip slides, and so forth to see that they are in proper form and then tests for line voltage. If the line voltage at line 14 is not satisfactory, the program goes back to line 8 and the start. If the line voltage is satisfactory, a false boost signal is output at line 16 of the program because the line switch cannot be picked up until a boost is provided, so a false boost is provided for this purpose. The motors will not be energized at this time because the ON and OFF pulses for the thyristors have been suppressed. If the line voltage is all right, then in line 17 of mode 2 of the program the line switch is closed for charging the commutating capacitors and a check is made at line 18 to see if all the inputs are as desired, and if they are satisfactory, the program at lines 20 and 21 initializes certain timer variables.

In line 24 of mode 3 of the program the program waits for a pulse from an external clock at 218 Hz from a crystal oscillator and when the program sees the rising edge of the clock pulse, it provides the front end of the boost to fire the ON pulse and puts the ON pulse positioner up to output the request through output port 106 shown in FIG. 3.

Lines 26 to 30 of mode 4 of the program are controlling the external analog phase controller 108 to provide a boost interval for interpreting the current signals and other things as to where the ON pulse will be and whether or not it is allowed, and providing the ON suppress and the OFF suppress.

In mode 5 lines 40 to 64, the program reads analog inputs and sets some variables. The P signal which is a linear monotonic type signal is converted to effort. When the P signal is above 60 milliamps as shown in FIG. 15, this is a power request, when the P signal is below 60 milliamps it is a brake request, and below 20 milliamps it is superbrake. If the line voltage LVL is less than some predetermined number than the operator RE is set to retard the effort. In addition, a speed taper is provided whereby the speed signal S is read in the outside world and is modified so that the internal speed signal SS stays at the given level as long as the external speed signal is within predetermined limits. The external speed S is the actual vehicle speed and the internal speed SS is the value that the program is using for its operations. In effect a window is put on the real vehicle speed and then used inside the program as a bracketed speed such that as the outside speed starts moving up, then the inside speed SS does not change for as long as the outside speed S is within this provided window, thereby if the outside speed S has noise interference, this provides a dead band for filtering the noise and other disturbances out of the actual speed signal S.

In lines 32 to 38 of mode 6, a determination is made to go to power or go to brake and to confirm that the control is in power or the control is in brake for the purpose of setting up the request.

Starting at line 65 of mode 7, the P signal is considered, which P signal has a value from 0 to 100, for the generation of requested effort. If the control is in power and the P signal is above 60 milliamps, this requires more effort. If the P signal is below 60 milliamps and the control is in power, this maintains a minimum effort. If the control is set in brake and the P signal is below 60 milliamps, this requests an increased brake effort down to 20 milliamps, at which time the same effort is held. If the P signal is above 60 milliamps but the BRK signal does not allow the control to go into power, a minimum brake effort is maintained. In addition, a jerk limit is provided in lines 75 to 82 of the program because the P signal can change instantly to a full 100 milliamps and must be jerk limited such that the effort signal has to increase on a ramp in one program cycle step at a time. The jerk limited P signal is incremented by one unit each program cycle to provide the desired ramp and repeatedly incrementing one at a time determines how quick the effort increases. When going into brake to prevent an abrupt fade-out of the electric motors and to permit a smoother blending of the friction brakes, a false fade-out is provided in lines 84 to 89 of the program so the electric braking fades out on a softer slope to permit the friction brakes to maintain a smooth and total braking effort.

Lines 94 to 98 of mode 8 of the program provides a check for a zero speed when the actual speed is less than a defined amount such that the vehicle is considered to be standing still at zero speed. In addition, zero speed clears the Z carrier within the program used in a situation when there is too much current in brake, which indicates an overload and the operation should be shut down. In line 99 of the program, if the vehicle is at zero speed and a request for power is received, then the Z carrier is cleared to go back into power. A check is made at line 100 to see if the line voltage is too low, and if it is too low, the program returns to the beginning of the program since there is not enough energy for the commutating capacitor and the present control apparatus is not required to operate below a predetermined voltage level, which could mean that the vehicle is operating in a rail gap and the normal mode is to shut down the equipment when going into a rail gap. In addition in line 101 of mode 8, a check is made for excessive line voltage which is used for incrementing the RE request. If the voltage is too high, the Y carrier is set for the purpose of skipping ON pulses, and the RE request starts reducing the motor current and this reduces the line current. A check is made for LCOC which is a signal that indicates that all the power circuitry is made up properly. If any of the conditions, such as a thermal overload or a slip/slide signal or the like, indicates improper action, the effort request is reduced and a suppression of the ON pulse is effected.

The Y carrier controls the ON pulse, the OFF pulse and the T5 pulse. A check is made to see if motor current I1 is greater than motor current I2 or vice versa to maintain the desired balance in the motors. A check is made at line 105 to see that I0, which is a sum of I1 and I2, is not exceeding the request IR by more than a certain amount; and if it is, the ON pulses are skipped.

The line current limit check in line 103 of mode 8 is provided to establish that the respective currents in each of the motor circuits are within a predetermined match of each other in relation to balance; if they are, the operation is satisfactory; and if not, corrective action is taken. Towing protection is provided on line 104 to enable a train vehicle to be pulled or towed; if there is a failure in the external equipment of a given vehicle, it is desired that this be recognized and the vehicle operated such that the other operating cars in the train can tow the disabled vehicle.

In lines 110 to 113 of mode 9 of the program the current request is generated from the PR signal from which the retard effort RE is subtracted to get the IR request signal, and a speed tilt is provided in relation to a power mode or brake mode of operation to change the current request IR on the field shunt and check of the inputs. The effort request is the modified P signal which has been modified, then a speed tilt is added to the modified P signal by looking at the speed and tilting the P signal plus when power operation is desired and tilting the P signal negative for brake operation. The speed tilt is provided in lines 114 and 115 by chopping off a little bit of the requested current to compensate for the effort required to maintain acceleration as speed increases; in effect, the requested current is added to or subtracted from, depending upon whether the control is in power or in brake, and this adds or subtracts an increment of vehicle speed. In this regard, during brake, the motor is dragging and the car is dragging, so less effort is needed from the motor current because the drag is additive; however, in power operation, the drag is against the propulsion effort, so additional motor current and effort is provided to compensate for the needed extra power to properly operate the vehicle. The provided speed tilt accomplishes this function in relation to the speed of the vehicle. For the change of the current request on field shunt in lines 116 to 118, if in field shunt operation, then the motor characteristics are different; the field shunt is field weakening, and there is a different current level needed to get the desired motor torque. The input check is provided at lines 120 to 123 to make sure that all the switches and so forth are set where they should be. The input 4 relates to the temperature of the semiconductors; this temperature in the prior art was sensed and if too high was previously used to shut everything down as an irrevocable control move. In the present system, restarting of the program is permitted after a too high semiconductor temperature is sensed. Input 4 is presently checked to see if the temperature is not too high, if it is satisfactory the ON pulse for the chopper is allowed, and the incremental loop timer goes to mode 10. If the semiconductor temperature is too high, the program goes to mode 10 and if necessary, a T5 pulse is fired; for a given cycle of program operation, it may be desired to cancel the ON pulse for that cycle or suppress the OFF pulse or shut off the T5 pulse, or even to turn on the T5, depending on what is desired. If the semiconductor temperature in the next cycle is back to a desired level, the program continues as normal to avoid a total shut-down and permit the transit vehicle to continue running. The present control provides a lessening of the provided effort to permit the equipment to continue running within capabilities and contributing some partial desired effort to the train movement.

Mode 10 of the program includes four selectable control operations—namely, CYCPP which is confirmed power, CYCBB which is confirmed brake, CYCBP which is cycling from brake to power, and CYCPB which is cycling from power to brake. These relate to differences in the desired vehicle control as to when a particular control is desired and what kind of control is desired. More specifically, for the first control operation of CYCPP which is confirmed power, it is desired to stay in power and to confirm that the control is presently in power; the field shunt is closed in lines 129 to 132 in relation to phase angle and the line voltage is cut back in line 134 in relation to low voltage. The close of the field shunt is provided to increase the train speed. To keep the current flowing in the motor, it is necessary to keep turning the chopper ON for longer periods of time to keep increasing the percentage of voltage to counteract the counter EMF of the motor. At some control point, it is desired to move to field weakening, and the control approach taken here senses the chopper being ON for 95% of the time and field weakening is then provided.

In the second operation of CYCBB which is confirmed brake, the request is to be in brake and the control operation is confirmed to be already in brake. This portion of the program permits improved control in the braking mode in relation to regeneration of power, wherein a sequence of control steps is provided in lines 147 to 151 taking progressively stronger action if the line voltage gets beyond defined limits in an effort to control the maximum level of line voltage. If the line voltage starts getting above a predetermined first limit CE, then the request is cut back by two; if the line voltage gets above a predetermined second limit D4, then the previous action has added to it a stronger reduction and so forth through greater predetermined limits to effect progressively increased current reductions due to excess line volts by suppressing ON pulses for the chopper to provide this current reduction.

A hysteresis for brake build-up is provided at lines 152 to 156 by trying to get at least a minimum predetermined current level in the brake mode after the motor armature current has been reversed for braking; this portion of the program provides the requested brake effort in conjunction with a minimum effort to assure an adequate brake current. The problem is to assure after the propulsion motors are established in the proper way to start generating brake current, that the armature current is built up in time to prevent loss of the armature current because when changing from power to electric braking, the braking armature current results from the residual magnetism left over in the field circuits of the motor. If the control apparatus does not operate fast enough and lets this residual magnetism go to zero, the armature current will not build up. In relation to a contribution to regenerative braking or electrical braking, the present control apparatus enables a build up of brake current after going to the brake mode, such that when the build up contactor is closed thereafter only ON pulses are provided with a defeat of OFF pulses until a minimum armature current is present in an effort to assure that the armature current gets started as quickly as it can and before there occurs a loss of the residual field magnetism. The propulsion motor is a series motor, so the armature and field windings are in series. After cutting the armature current to go into a brake operation, it takes a while for the field to be reenergized and this is the residual magnetism that is involved in this operation; the armature circuit is reversed for brake operation, but the field does not go to zero instantly because of residual magnetism. When it is desired to go into the brake mode of operation, the program maintains a minimum level of current in the brake mode and permits the armature current build up in the opposite direction to an adequate level to maintain the field magnetism and still reverse the current flow in the armature; the control operation desires a current above a certain value and assures that at least this value of armature current is maintained.

In the operation of the prior art analog system of something went wrong, one of the parallel operative analog circuits was caused to reduce the effort request P signal to maintain a reduced level for as long as necessary, and when the system operation was again satisfactory the effort request P signal would ramp up again on a jerk limiter basis. The previous analog control apparatus modified the P signal in response to undesired line voltage and line current conditions before the P signal was applied to control the chopper apparatus. The previous analog control apparatus did not have the capability of providing the time variable control operation as well as the high and low limits determined.

RETARD EFFORT PARAMETER

The retard effort parameter RE is a false parameter that is used to modify the current request I+ output by the analog output 106 to a level that is determined by a number of operational conditions, and when RE is increased then a bigger number is subtracted from the current request I+. The current request IR is determined primarily by the P signal coming into the analog input 102, and then the P signal is modified in the program to develop the current request I+. One of the factors which affects this is the level of RE.

At line 76 of the program, a first condition is established such that if the line voltage is less than a determined value of 0C8 hexadecimal, then there is subtracted one unit quantity from RE everytime the computer program goes through three cycles, such that N equals 3.

To increase RE at line 101 of the program, a second condition is established that if the line current IL is greater than a predetermined value corresponding to 0C7 hexadecimal, then RE is increased by the quantity of plus 2 every cycle through the program. This monitors the line current IL, which is brought into the analog input 102, and if IL goes above a certain predetermined maximum number, then RE is increased. IL is the supply line current and it can be related in power by the sum of the two motor currents I1 plus I2 times the percentage of the ON time of the chopper, and in braking it is the sum of the two motor currents I1 plus I2 times the percentage of the OFF time. Line current is measured physically in actual practice by monitoring the current in the supply line with a Hall device. At line 101 of the program, if line current IL exceeds a certain predetermined amount, then RE is increased by a factor of 2 every cycle of the program, and this is cumulative. The purpose of this operation is to reduce the current request I+ because too much current is being drawn from the line; there are control system considerations that desire a limit on the amount of power that a vehicle can draw from the line.

At line 102 of the program, a third condition is provided such that if RE is less than 2, then RE is set equal to 2 to provide a boundary on the minimum value that RE can have. For example in the operation of the statement at line 76, if the line voltage were to remain continuously less than this number 0C8 hexadecimal, then RE would continuously be reduced by one for every three program cycles and it would go from a positive number and eventually become negative, and RE should be stopped at a reasonable boundary. The first portion of the statement in line 102 establishes a minimum quantity for RE equal to 2.

A fourth condition is provided by line 102 in the next portion, stating that if RE+1 is greater than PR, which is related to the P signal, then RE is set equal to PR−1. What this says is that RE can never exceed the current request by one. If RE, for some reason, keeps growing bigger and bigger, and it is then subtracted from the current request, the most that is desired to be subtracted is a value slightly less than the current request. Therefore, RE is bounded by the relationship that it can never be less than 2 and it can never be greater than one less than the current request, with the current request always being at least one. The first statement at line 76 operates every three program cycles on RE in relation to line current, and the next statement at line 102 establishes the upper and lower bounds of RE, and this is done every cycle through the program.

PR is the current request that is determined by the P signal; at line 111 of the program PR is set equal to PO, which is the jerklimited and modified P signal. And then at line 112 PR is set equal to PR+PR+PR+ a constant, which is a simple way of multiplication and setting PR equal to three times itself plus a constant. At line 113 the current request IR, which is actually outputted from the analog output 106 as the signal I+ in terms of the outside world and is IR inside the computer, is set equal to PR minus the parameter RE, and this signal IR then goes to the analog phase controller 108 to control the chopper apparatus.

At line 134 of the program, if IRW is greater than LVL then RE is set equal to RE+2. This statement provides that if the current request IRW, which has been load-weighed, is greater than line voltage LVL which is a processed line voltage, then RE is incremented by 2. The purpose of this statement is to modify the current request that is supplied to the chopper, since the commutating circuit in the chopper operates as a function of the line voltage. That is, as the line voltage decreases, the energy storage elements in the commutating circuit respond to the line voltage decreases and the commutating capability of the chopper is decreased as the energy stored in the commutative capacitor is decreased, so that the current request that is permitted is reduced as a function of the decreased line voltage, and this is done once per cycle, by increasing the retard effort RE as required for this purpose.

At lines 147 to 151 of the program, there are a number of conditions where the retard effort parameter is modified in relation to measuring the line voltage LV. In line 147 if the line voltage LV is greater than a predetermined value 0CE hexadecimal, then RE is set equal to RE+2. In line 148, if the line voltage LV is greater than a second and larger predetermined value 0D4 hexadecimal, then retard effort RE is set equal to the previous value of RE+2 with the addition of 3. In line 149, if the line voltage LV is greater than a third and still larger predetermined value 0DA hexadecimal, then retard effort RE is set equal to the previous value of RE+2+3 with the addition of 4. In line 150, if the line voltage LV is greater than a fourth and bigger predetermined value 0E0 hexadecimal, then retard effort RE is set equal to the previous value RE+2+3+4 with the addition of 5. And in line 151, if the line voltage LV is greater than a fifth and still bigger predetermined value 0E6 hexadecimal, than a total suppression of ON pulses to the chopper is provided by Y set equal to 02 hexadecimal. This procedure is used to adjust the current request I+ to a value such that the line voltage is regulated at a proper reference point in the braking mode.

The operation of this is seen in FIG. 13 in terms of motor current as shown by curve 439 and line voltage, as shown by curve 440 with the line voltage being increased due to the switching of the braking resistors in the motor circuit and the associated and resultant decrease in the motor current which is caused by the effect of the retard effort parameter RE being increased. The third curve 439 shows the slow reestablishment of motor current after each such decrease and due to the operation of the first statement in line 76 where the retard effort RE is reduced once every third program cycle, to result in the decrementation of RE at a slower rate than at which it was incremented.

A desired current request PO is established and this control parameter RE modifies the desired current request to determine the actual current request I+ that goes to the analog phase controller 108. Line current modification of RE is a very slow process, since drastic action is not desired in this regard, while line voltage is a very quick process, and it is a progressive incrementation of RE to make sure that the controlled operation does not exceed the commutative ability of the chopper.

The retard effort parameter RE is responsive to several input signals in the computer operation because the several input signals are better correlated in a nonlinear manner at one time. The line voltage will change in response to the current drawn by the train vehicle or in response to the current supplied back into the line. If the line voltage drops because too many vehicles are drawing current from the line, and if the individual vehicle system were uncontrolled it would request still more current from the line, and this would drop the line voltage still more. If the line voltage is less than a predetermined value, such as 0C8H, then the retard effort RE is reduced by one unit every third cycle of the program operation and this permits the retard effort RE to recover to a minimum value as desired. As retard effort RE increases to put more of a current restriction on the line supply, the requested effort is retarded and correspondingly the line-supplied current is reduced, and this can occur when the line voltage is getting too low for a given vehicle speed and tractive effort request. The retard effort RE function is such that as the line voltage drops for any reason, then the retard effort parameter RE is increased to reduce the line-supplied current to a given vehicle and the corresponding requested effort is retarded. If the line voltage returns to a predetermined limit or above, then retard effort RE has to be reduced toward zero. If line volts are greater than some value such as 800 volts, the retard effort RE is reduced for permitting the line-supplied current to increase to the vehicle as otherwise requested by the control system, and the retard effort RE is reduced at a jerk limited rate every third cycle of program operation for providing a ramp effect.

The supply line current curve 424 of FIG. 12 shows that as the vehicle speed is increased, the chopper is phase ON more and more, and then using the relationship of the sum of the two motor currents times the chopper ON time equals line current, there is shown the regulation of the line current and the resultant leveling off and the regulation action taking place and provided by the operation of the parameter RE.

The retard effort parameter RE in its application for the control of line voltage control in braking at program lines 147 to 151 has four different levels of control and each one of those acts as a different control operation in relation to and also in a different time sense also. Each time through the program loop a sample of line voltage is taken to establish a value for RE. For each program cycle the previous value of RE is changed according to the value of the line voltage LV. Because the magnitude of line voltage is not linear, it provides a different response time with an acumulation or incrementation of RE, because the operation is additive in relation to what RE was before, until the RE reaches a level where the equation is satisfied.

I claim:

```
     0F0H:

1       DECLARE (K, IPW, I0,I1,I2,IR,LVL,PR,RE,TI) ADDRESS;

2       DECLARE (IL,LV,M,M0,M1,N,PH,PI,PN,P0,TT) BYTE;

3       DECLARE (S1, T0S, Z1, Q,S,SS,T,TP,TS,X,X1,X2,Y,Z) BYTE;

4       DECLARE (MODE1,MODE2,MODE3,MODE4,MODE5) LABEL;

5       DECLARE (MODE6,MODE7,MODE8,MODE9,MODE10) LABEL;

6       DECLARE (MODE11,CYCPP,CYCPB,CYCPB,CYCBP) LABEL;

7       GO TO MODE1;

8   100H: MODE1: OUTPUT(1)=0F1H; Q=0;

9       OUTPUT(5)=24H;
```

```
10        IF (INPUT(4) AND 3FH)<>12H THEN GO TO MODE1;
11        OUTPUT(6)=080H+Q; OUTPUT(6)=Q;
12        OUTPUT(3)=86H; OUTPUT(4)=00H;
13        LV=INPUT(5);
14        IF LV<76H THEN GO TO MODE1;
15        GO TO MODE2;

16  140H: MODE2: OUTPUT(1)=0F2H; OUTPUT(3)=14H;
17        OUTPUT(5)=34H; OUTPUT(3)=04H;
18        IF (INPUT(4) AND 3FH) <>02H THEN GO TO MODE2;
19        OUTPUT(3)=82H; OUTPUT(3)=02H;
20        M=0; M1=0; N=0; P0=00H; RE=2; TI=0; T=0;
21        TP=2; TS=0; Y=02H; Z=1;
22        GO TO MODE3;

23  1C0H: MODE3: OUTPUT(1)=0F3H;
24        IF (INPUT(4) AND 80H) =80H THEN GO TO MODE3;
25        GO TO MODE4;

26  200H:  MODE4: OUTPUT(1)=0F4H;
27        OUTPUT(3)=(10H+(Y AND 0F7H));        CALL TIME(4);
28        OUTPUT(3)=90H+Y; OUTPUT(4)=SHR(IR,1);
29        OUTPUT(3)=10H+Y; CALL TIME(4);
30        OUTPUT(3)=Y;
31        GO TO MODE5;

32  260H: MODE6: OUTPUT(1)=0F6H;
33        IF (INPUT(4) AND 40H)=00H  AND TS>0F0H AND Z=1 THEN DO;
34          M=1; TS=0; END;
35        IF (INPUT(4) AND 40H)=40H   THEN M=0;
36        IF TS>0F4H THEN TS=0F4H;
37        IF (INPUT(4) AND 20H)=00H   THEN M0=0; ELSE M0=1;
38        IF S>0FDH THEN M=0;
39        GO TO MODE7;
```

```
40  300H: MODE5: OUTPUT(1)=0F5H;
41        OUTPUT(6)=080H+Q; OUTPUT(6)=Q;
42        N=N+1;
43        I1=INPUT(5);
44        OUTPUT(6)=090H+Q; OUTPUT(6)=Q;
45        SS=SHR(S,3);
46        I2=INPUT(5);
47        OUTPUT(6)=0A0H+Q; OUTPUT(6)=Q;
48        I0=I1+I2;
49        IL=INPUT(5);
50        OUTPUT(6)=0B0H+Q; OUTPUT(6)=Q;
51        OUTPUT(6)=Q; OUTPUT(6)=Q;
52        LV=INPUT(5);
53        OUTPUT(6)=0C0H+Q; OUTPUT(6)=Q;
54        LVL=LV;
55        LVL=LVL+LVL+LVL;
56        S1=INPUT(5);
57        OUTPUT(6)=0D0H+Q; OUTPUT(6)=Q;
58        OUTPUT(6)=Q; OUTPUT(6)=Q;
59        PN=INPUT(5);
60        OUTPUT(6)=0E0H+Q; OUTPUT(6)=Q; OUTPUT(6)=Q; OUTPUT(6)=Q;
61        PH=INPUT(5);
62        OUTPUT(6)=0F0H+Q; OUTPUT(6)=Q; OUTPUT(6)=Q; OUTPUT(6)=Q;
63        IRW=INPUT(5); IRW=IRW+IRW+IRW+IRW;
64        GO TO MODE6;

65  400H: MODE7: OUTPUT(1)=0F7H;
66        IF PN<96H THEN PI=99H-PN;
67        IF PN>9CH THEN PI=PN-99H;
68        IF PN<9EH AND PN>94H THEN PI=0;
69        IF PN<96H AND M=1 THEN PI=0;
70        IF PN>9CH AND M=0 THEN PI=0;
71        IF PI>66H THEN PI=66H;
```

```
72      IF PN<26H THEN DO;
73         PI=66H; M=0; END;
74      IF M=1 THEN PI=PI+SHR(PI,2);
75      IF N>3 THEN DO;
76         N=0; IF LV<0C8H THEN RE=RE-1;
77         IF (M+M0=1) THEN DO;
78            T=T+1; P0=P0-1; END;
79         ELSE DO;
80            IF IRW>(I0+24H) THEN P0=P0-2;
81            IF PI>P0+1 THEN P0=P0+1;
82            IF PI<P0-1 THEN P0=P0-1; END;
83         END;
84      IF M0=0 THEN DO;
85         IF S<60H AND S>10H THEN DO;
86            IF P0>(S+S-20H) THEN P0=(S+S-20H);
87            END;
88         IF S<11H THEN P0=04H;
89         END;
90      IF P0<4 THEN P0=4;
91      IF S1>S+3 THEN S=S+1;
92      IF S>S1+3 THEN S=S-1;
93      GO TO MODE8;

94  580H: MODE8: OUTPUT(1)=0F8H;
95      IF S<09H THEN DO;
96         X=04H; IF M0=0   THEN Z=1; END;
97         ELSE X=05H;
98      IF S>33H THEN X=01H;
99      IF Z=1 THEN Y=00; ELSE DO; P0=4; GO TO MODE11; END;
100     IF LV<6EH THEN GO TO MODE1;
101        IF IL>0C7H THEN RE=RE+2;
102        IF RE<2 THEN RE=2; IF RE+1>PR THEN RE=PR-1;
103        IF I1>I2+30H THEN Y=02H; IF I2>I1+30H THEN Y=02H;
```

```
104     IF IO>40H THEN M1=M0;
105     IF IO>IRW+0C0H THEN Y=02H;
106     IF (IO>IRW+100H) OR (IO>2F0H) THEN DO;
107        Q=0; X1=X1+30H; Y=02H; X2=00; P0=02H; IR=00H; Z=0;
108        GO TO MODE11; END;
109     GO TO MODE9;

110  720H: MODE9: OUTPUT(1)=0F9H;
111     PR=P0;
112     PR=PR+PR+PR+2FH;
113     IR=PR-RE;
114     IF (SS<IR AND M0=0) THEN IR=IR-SS;
115     IF M0=1 THEN IR=IR+SS;
116     IF (INPUT(4) AND 02H)=00H THEN IR=IR+49H;
117     IF IR>1FFH THEN IR=1FFH;
118     IF IR<49H THEN IR=49H;
119     IF (INPUT(4)AND 1DH) <> 00 THEN TT=0;
120     IF TT<06H THEN DO;       P0=4;Y=03H; END; ELSE DO;
121     TT=70H; END;
122     IF (INPUT(4) AND 08H)=08H THEN Y=0BH;
123     TT=TT+1;
124     GO TO MODE10;

125  800H: MODE10: OUTPUT(1)=0FAH;

126     CYCPP: IF M=1 AND M0=1 THEN DO;
127        OUTPUT(1)=8AH; Q=0; TI=0; T=0; X1=10H;
128        IF PH>0E5H THEN DO;
129           TP=TP+1; IF TP>13H THEN TP=13H;
130           IF TP>10H THEN X2=80H; END;
131        IF PH<0D0H THEN DO;
132           TP=TP-1; IF TP<2 THEN TP=2;
133           END;
```

```
134         IF IRW>LVL THEN RE=RE+2;
135         GO TO MODE11;
136         END;

137   CYCBB: IF M=0 AND M0=0 THEN DO;
138         OUTPUT(1)=1AH; T=0;
139       TS=TS+1; TP=2; TI=TI+1; IF TI>200H THEN TI=200H;
140         X1=30H; X2=00H; T=0; Q=00H;
141         IF S>009H THEN Q=0FH;
142         IF S<1AH THEN DO; Y=02H; IR=0; GO TO MODE11; END;
143         IF S>78H THEN Q=07H;
144         IF S>96H THEN Q=03H;
145          IF S>0B4H THEN Q=01H;
146         IF S>0D3H THEN Q=00H;
147       IF LV>0CEH THEN RE=RE+2;
148       IF LV>0D4H THEN RE=RE+3;
149       IF LV>0DAH THEN RE=RE+4;
150       IF LV>0E0H THEN RE=RE+5;
151       IF LV>0E6H THEN Y=02H;
152        IF I0<30H THEN K=030H;
153        IF I0>80H THEN K=30H;
154        IF I0<80H AND TI<190H AND M1=1 THEN X=X+2;
155        IF I0<K   THEN DO; Y=Y+04H; TOS=0; END; ELSE DO;
156          TOS=TOS+1; IF TOS<2 THEN Y=Y+04H; IF TOS>8 THEN TOS=8; END;
157        IF LV>0FDH THEN Z1=1;
158        IF Z1=1 THEN DO;
159           X1=70H; Q=0; Y=0AH;      IR=2; END;
160         GO TO MODE11; END;

161   CYCBP: IF M=0 AND M0=1 THEN DO;
162         OUTPUT(1)=4AH; TS=TS+1; TI=0;
163         IF ((INPUT(4) AND 02H) =02H) AND (IR<99H) THEN Y=02H;
164         IF IR<50H THEN Y=02;
```

```
165         IF P0<5 AND ((I0<3FH) OR (T>0F0H)) THEN DO;
166            X1=30H; X2=00H; END;
167            GO TO MODE11; END;

168    CYCPB: IF M=1 AND M0=0 THEN DO;
169            OUTPUT(1)=2AH; TP=2;
170            Z1=0;
171            IF IR<50H THEN Y=02;
172            IF P0<5 AND ((I0<3FH) OR (T>0F0H)) THEN DO;
173               X1=10H; X2=00H; END;
174            IF (T>0D8H) AND (I0>3FH) THEN DO;
175               X1=50H; X2=00H; END;
176            GO TO MODE11; END;
177  0AC0H: MODE11: OUTPUT(1)=0BH;
178            OUTPUT(5)=(X+X1+X2);
179            GO TO MODE3;

180            EOF;
```

1. In an effort control apparatus for an electric motor having an armature and operative with an effort request signal and a power supply for supplying line current and line voltage to determine the operation of said motor, the combination of means for providing a retard effort control parameter for each of predetermined time intervals by determining for each said time interval the present value of said retard effort control parameter in response to each of said line voltage and said line current, means for subtracting from said effort request signal the present value of said retard effort control parameter for providing a current request for controlling the armature current of said motor for each said time interval, and means for supplying to said retard effort control parameter providing means the value of each of the line voltage and the line current for each said time interval.

2. The effort control apparatus of claim 1, with said retard effort control parameter providing means comparing the line voltage of the power supply with a predetermined reference for reducing the previous value of said retard effort control parameter to determine said present value when said line voltage is less than said predetermined reference.

3. The effort control apparatus of claim 1, with said retard effort control parameter providing means changing the previous value of said retard effort control parameter in accordance with a predetermined time characteristic in relation to a plurality of said time intervals to determine said present value.

4. The effort control apparatus of claim 1, with said retard effort control parameter providing means being responsive to the line voltage of said power supply.

5. The effort control apparatus of claim 1, with said retard effort control parameter providing means being responsive to the line current for increasing the retard effort control parameter by a predetermined quantity for each time interval the line current is greater than a desired value.

6. The effort control apparatus of claim 1, with said retard effort control parameter providing means comparing the line current providing by said power supply with a predetermined reference for increasing the value of said retard effort control parameter by a known quantity that is cumulative in relation to said time intervals when said current is greater than said reference.

7. The effort control apparatus of claim 1, with the effort control parameter providing means establishing a maximum value and a minimum value on said retard effort control parameter.

8. The effort control apparatus of claim 1, with said retard effort control parameter providing means being responsive to line voltage to reduce a predetermined quantity from said retard effort control parameter when said line voltage is less than a desired level.

9. The effort control apparatus of claim 1, with said current request providing means providing a current request for each said time interval in accordance with said effort request signal reduced by the present value of said retard effort control parameter, and means for modifying the value of said retard effort control parameter in accordance with a predetermined relationship between said current request and the line voltage of said power supply.

10. In the method of providing effort control for an electric motor having an armature and operative with an effort request signal and a power supply for supplying line current and line voltage to said motor, determining the value of each of said line current and line voltage for each of successive predetermined time intervals, determining the present value of a retard effort control parameter to establish the armature current of said motor for each one of said time intervals by modifying the previous value of said retard effort control parameter in relation to said value of each of the line current and line voltage for said one time interval, and controlling the armature current of said motor for said one time interval in response to the difference between said effort request signal and the present value of said retard effort control parameter.

11. The method of claim 10, with said modification of the previous value of said retard effort control parameter being operative to compare a reference value of the line voltage of said power supply with said determined value of the line voltage.

12. The method of claim 10, with said determined value line being the voltage of said power supply.

13. The method of claim 10, with said modification of the previous value of said retard effort control parameter being in accordance with a predetermined cycle time characteristic in relation to more than one of said time intervals.

14. The method of claim 10, with said line current provided by said power supply being greater than a predetermined value.

15. The method of claim 10, including the step of establishing a maximum limit and a minimum limit on the present value of said retard effort control parameter.

16. The method of claim 10, with said step of controlling the armature current of said motor being in accordance with a motor current request signal established as said difference between said effort request signal and the present value of said retard effort control parameter.

17. In an effort control apparatus for an electric motor having an armature and operative with a power supply and an effort request signal, the combination of means for providing an effort control parameter to establish a restriction on the armature current of the motor by determining the present value of said effort control parameter for each of successive and predetermined time intervals by each one of increasing the previous value of the effort control parameter in relation to a first operational condition of the power supply and decreasing the previous value of the effort control parameter in relation to a second operational condition of the power supply, means responsive to both the effort request signal and the present value of the effort control parameter for controlling the armature current of the motor for each said time interval, and means supplying the operational condition of said power supply to said effort control parameter providing means for each said time interval.

18. The effort control apparatus of claim 17, with said effort control parameter providing means determining a present value of said parameter that is cumulative through said successive time intervals.

19. The effort control apparatus of claim 17, with the present value of the effort control parameter being determined by both of increasing the previous value and decreasing the previous value.

20. In the method of providing effort control for an electric motor having an armature and operative with a power supply and an effort request signal, the steps of determining first and second operational conditions of said power supply for each of successive time intervals, determining the present value of an effort control parameter for one of said time intervals by modifying a previous value of said parameter for an earlier time interval in response to each of said first operational condition for said one time interval being less than a first reference and said second operational condition for said one time interval being greater than a second reference, and controlling the armature current of the motor during said one time interval in response to the effort request signal minus the present value of said parameter.

21. In an effort control apparatus for an electric motor operative with a power supply and an effort request signal, the combination of means for providing an effort control parameter at predetermined time intervals to establish a cumulative restriction in relation to a plurality of said predetermined time intervals on the effort controlling current of said motor by determining for each said time interval the present value of said effort control parameter in relation to a first operational condition of the power supply, means determining the difference between said effort request signal and the present value of said effort control parameter and controlling said current of the motor in response to said difference for each said time interval, and means for supplying to said effort control parameter providing means the operational condition of the power supply for each said time interval.

22. In the method of providing effort control for an electric motor operative with a power supply and an effort request signal, the steps of determining a plurality of operational conditions of said power supply for each of successive predetermined time intervals, determining the present value of an effort control parameter to establish the effort control current of said motor for each one of said time intervals by modifying the previous value of said effort control parameter in relation to each said operational conditions for each one of said time intervals, and controlling said current of said motor for said one time interval in response to the difference between each of said effort request signal and the present value of said effort control parameter.

23. In an effort control apparatus for an electric motor operative with a power supply and an effort request signal, the combination of
- means for providing an effort control parameter to establish a restriction on a predetermined current of the motor by determining the present value of said effort control parameter for each of successive and predetermined time intervals by each of increasing the previous value of the effort control parameter in relation to a first operational condition of the power supply and decreasing the previous value of the effort control parameter in relation to a second operational condition of the power supply,
- means responsive to the difference between the effort request signal and the present value of said effort control parameter for controlling said current of the motor for each said time interval, and
- means supplying the operational condition of power supply to said effort control parameter providing means for each said time interval.

24. In the method of providing effort control for an electric motor operative with a power supply and an effort request signal, the steps of determining first and second operational conditions of said power supply for each of successive time intervals,
- determining the present value of an effort control parameter for one of said time intervals by modifying a previous value of said parameter for an earlier time interval in response to each of said first operational condition for said one time interval being less than a first reference and said second operational condition for said one time interval being greater than a second reference, and
- controlling the effort control current of the motor during said one time interval in response to a predetermined difference between the effort request signal and the present value of said parameter.

25. The effort control apparatus of claim 1, with said retard effort control parameter providing means establishing a reduction in the present value of said retard effort control parameter by a comparison of said line voltage with each of a plurality of successively larger predetermined references.

26. The method of claim 10, with said modification of the previous value of the retard effort control parmeter providing respective reductions in the value of said retard effort control parameter by a comparison of the line voltage with each of a plurality of successively larger predetermined references.

* * * * *